US012260827B2

(12) United States Patent
Roh et al.

(10) Patent No.: US 12,260,827 B2
(45) Date of Patent: Mar. 25, 2025

(54) DISPLAY DEVICE INCLUDING SCAN DRIVER CONTROLLED BY CLOCK SIGNALS

(71) Applicant: SAMSUNG DISPLAY CO., LTD., Yongin-si (KR)

(72) Inventors: Jinyoung Roh, Yongin-si (KR); Bon-Seog Gu, Yongin-si (KR); Hae-Kwan Seo, Yongin-si (KR); Jaekeun Lim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/323,887

(22) Filed: May 25, 2023

(65) Prior Publication Data

US 2024/0062723 A1 Feb. 22, 2024

(30) Foreign Application Priority Data

Aug. 22, 2022 (KR) ........................ 10-2022-0104628

(51) Int. Cl.
*G09G 3/3266* (2016.01)
*G09G 3/20* (2006.01)
*G09G 3/32* (2016.01)

(52) U.S. Cl.
CPC ......... *G09G 3/3266* (2013.01); *G09G 3/2003* (2013.01); *G09G 3/32* (2013.01);
(Continued)

(58) Field of Classification Search
CPC .. G09G 3/00; G09G 3/20; G09G 3/32; G09G 3/36; G09G 3/3233; G09G 3/3266;
(Continued)

(56) References Cited

U.S. PATENT DOCUMENTS 9,589,525 B2 3/2017 Kim et al.
2007/0052658 A1 * 3/2007 Kim .................... G09G 3/3677 345/100

(Continued)

FOREIGN PATENT DOCUMENTS

KR 10-1310004 9/2013
KR 10-2138107 7/2020

(Continued)

*Primary Examiner* — Chanh D Nguyen
*Assistant Examiner* — Nguyen H Truong
(74) *Attorney, Agent, or Firm* — F. Chau & Associates, LLC

(57) ABSTRACT

A display device includes a display panel, a scan driver outputting a scan signal, and a data driver. The scan driver includes a first sub-scan driver that receives a first start signal and an odd clock signal, and a second sub-scan driver that receives a second start signal and an even clock signal. The scan signal has an activation period corresponding to a horizontal period. The odd clock signal includes a first clock enable period and a first clock disable period, which are 'k' times greater than the horizontal period. The even clock signal includes a second clock enable period and a second clock disable period, which are 'k' times greater than the horizontal period. The first clock enable period and the second clock enable period alternate with one another.

17 Claims, 10 Drawing Sheets

(52) U.S. Cl.
CPC ............... *G09G 2300/0452* (2013.01); *G09G 2310/0267* (2013.01); *G09G 2310/08* (2013.01); *G09G 2330/021* (2013.01)

(58) Field of Classification Search
CPC .......... G09G 3/3275; G09G 5/00; G09G 5/03; G09G 5/18; G02F 1/133; G02F 1/1333; G02F 1/1345; G02F 1/1368; G02F 1/1362; G02F 1/1335; G11C 7/00; G11C 19/00; G11C 19/28; H03K 3/00; G06F 3/038
See application file for complete search history.

(56) References Cited

U.S. PATENT DOCUMENTS

| | | | | |
|---|---|---|---|---|
| 2009/0256833 | A1* | 10/2009 | Huang | G09G 3/20 345/213 |
| 2010/0201666 | A1* | 8/2010 | Tobita | G09G 3/3677 377/79 |
| 2013/0235026 | A1* | 9/2013 | Yamamoto | G11C 19/184 345/100 |
| 2017/0115802 | A1* | 4/2017 | Sun | G02F 1/133308 |
| 2018/0158741 | A1* | 6/2018 | Kim | H01L 22/32 |
| 2018/0226039 | A1* | 8/2018 | Han | G09G 3/3677 |
| 2021/0241673 | A1* | 8/2021 | Liu | G09G 3/2092 |
| 2024/0169908 | A1* | 5/2024 | Shang | G09G 3/3275 |

FOREIGN PATENT DOCUMENTS

| | | |
|---|---|---|
| KR | 10-2022-0016420 | 2/2022 |
| KR | 10-2379778 | 3/2022 |

* cited by examiner

DISPLAY DEVICE INCLUDING SCAN DRIVER CONTROLLED BY CLOCK SIGNALS

CROSS-REFERENCE TO RELATED APPLICATIONS

This U.S. non-provisional patent application claims priority under 35 U.S.C. § 119 to Korean Patent Application No. 10-2022-0104628 filed on Aug. 22, 2022, in the Korean Intellectual Property Office, the disclosure of which is incorporated by reference in its entirety herein.

1. TECHNICAL FIELD

Embodiments of the present disclosure described herein relate to a display device, and more particularly, relate to a display device capable of reducing power consumption.

2. DISCUSSION OF RELATED ART

Electronic devices, which provide images to users, such as a smartphone, a digital camera, a notebook computer, a navigation system, and a smart television include a display device for displaying the images. The display device generates an image and provides the users with the generated image through a display screen.

The display device includes a plurality of pixels for generating an image and a driving unit for driving the pixels. Each of the pixels includes a light emitting element and a pixel circuit connected to the light emitting element. The pixel circuit may be driven by the driving unit to allow the light emitting element to emit light.

However, a layout of the pixel circuit and the light emitting element do not maximize luminous efficiency while the resolution in a limited space is increased.

SUMMARY

At least one embodiments of the present disclosure provides a display device capable of reducing power consumption while a change in layout is minimized.

According to an embodiment, a display device includes a display panel including a plurality of pixels, a scan driver that provides a scan signal to the plurality of pixels, and a data driver that provides a data signal to the plurality of pixels. The scan driver includes a first sub-scan driver that receives a first start signal and at least one odd clock signal, and a second sub-scan driver that receives a second start signal and at least one even clock signal.

The scan signal has an activation period corresponding to a horizontal period. The odd clock signal includes a first clock enable period, which is 'k' times greater than the horizontal period, and a first clock disable period, which is 'k' times greater than the horizontal period. The even clock signal includes a second clock enable period, which is 'k' times greater than the horizontal period, and a second clock disable period, which is 'k' times greater than the horizontal period. The first clock enable period and the second clock enable period alternate with one another, and the 'k' is an integer greater than or equal to 2.

According to an embodiment, a display device includes a plurality of pixels, a plurality of scan lines connected to the plurality of pixels, and a plurality of data lines connected to the plurality of pixels, a scan driver that provides a scan signal to the plurality of scan lines, and a data driver that provides a data signal to the plurality of data lines.

A first color pixel among the pixels and a second color pixel among the pixels are connected to at least one data line among the plurality of data lines and alternate with one another. The scan signal has an activation period corresponding to a horizontal period. Color information of the data signal provided to the at least one data line is changed in units of time corresponding to 'k' times of the horizontal period. The 'k' is an integer greater than or equal to 2.

BRIEF DESCRIPTION OF THE DRAWINGS

The above and other objects and features of the present disclosure will become apparent by describing in detail embodiments thereof with reference to the accompanying drawings.

DETAILED DESCRIPTION

Figure 1:
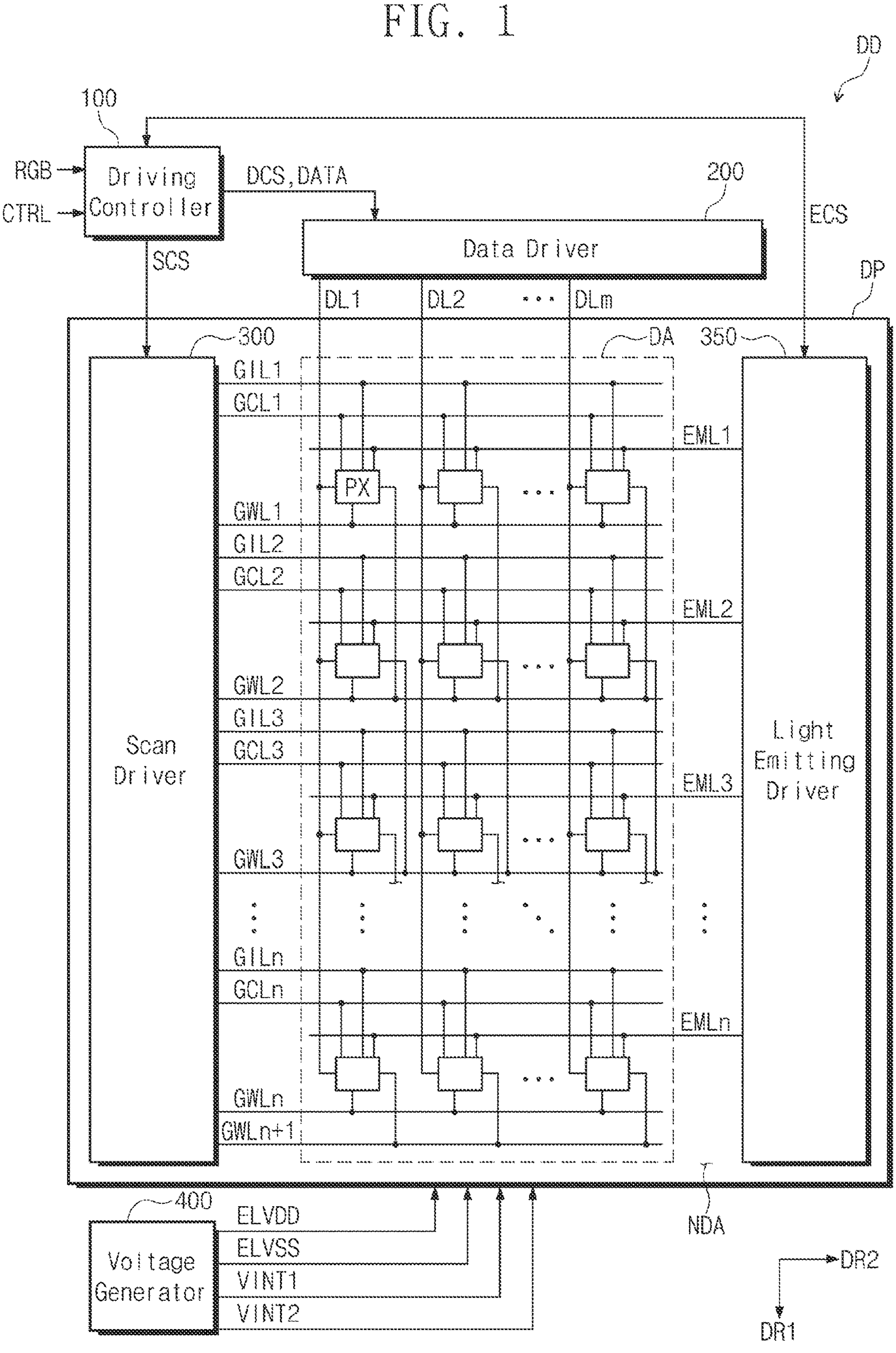
FIG. 1 is a block diagram of a display device, according to an embodiment of the present disclosure.

In the specification, the expression that a first component (or region, layer, part, portion, etc.) is "on", "connected with", or "coupled with" a second component means that the first component is directly on, connected with, or coupled with the second component or means that a third component is interposed therebetween.

The same reference numerals refer to the same components. Also, in drawings, the thickness, ratio, and dimension of components may be exaggerated for effectiveness of description of technical contents. The expression "and/or" includes one or more combinations which associated components are capable of defining.

Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

Hereinafter, embodiments of the present disclosure will be described with reference to accompanying drawings.

FIG. 1 is a block diagram of a display device, according to an embodiment of the present disclosure.

Referring to FIG. 1, a display device DD may be a device that is activated depending on an electrical signal to display an image. The display device DD may be applied to an electronic device such as a smart watch, a tablet PC, a notebook, a computer, or a smart television.

The display device DD includes a display panel DP, a panel driver for driving the display panel DP, and a driving controller 100 (e.g., a control circuit) for controlling an operation of the panel driver. According to an embodiment of the present disclosure, the panel driver includes a data driver 200 (e.g., a driver circuit), a scan driver 300 (e.g., a driver circuit), a light emitting driver 350 (e.g., a driver circuit), and a voltage generator 400.

The driving controller 100 receives an input image signal RGB and a control signal CTRL. The driving controller 100 generates image data DATA by converting a data format of the input image signal RGB in compliance with the specification for an interface with the data driver 200. The driving controller 100 generates a scan control signal SCS, a data control signal DCS, and an emission driving control signal ECS based on the control signal CTRL.

The data driver 200 receives the data control signal DCS and the image data DATA from the driving controller 100. The data driver 200 converts the image data DATA into data signals and outputs the data signals to a plurality of data lines DL1 to DLm to be described later. The data signals may refer to analog voltages corresponding to grayscale values of the image data DATA.

The scan driver 300 receives the scan control signal SCS from the driving controller 100. The scan driver 300 may output scan signals to scan lines in response to the scan control signal SCS.

The voltage generator 400 generates voltages used to operate the display panel DP. As an example of the present disclosure, the voltage generator 400 generates a first driving voltage ELVDD, a second driving voltage ELVSS, a first initialization voltage VINT1, and a second initialization voltage VINT2. In an embodiment, the first driving voltage ELVDD is higher than the second driving voltage ELVSS.

The display panel DP includes initialization scan lines GIL1 to GILn, compensation scan lines GCL1 to GCLn, write scan lines GWL1 to GWLn+1, emission control lines EML1 to EMLn, data lines DL1 to DLm, and pixels PX. The initialization scan lines GIL1 to GILn, the compensation scan lines GCL1 to GCLn, the write scan lines GWL1 to GWLn+1, the emission control lines EML1 to EMLn, the data lines DL1 to DLm, and the pixels PX may overlap a display area DA. The data lines DL1 to DLm extend in a first direction DR1 and are arranged spaced from one another in a second direction DR2. The initialization scan lines GIL1 to GILn, the compensation scan lines GCL1 to GCLn, the write scan lines GWL1 to GWLn+1, and the emission control lines EML1 to EMLn extend in the second direction DR2. The initialization scan lines GIL1 to GILn, the compensation scan lines GCL1 to GCLn, the write scan lines GWL1 to GWLn+1, and the emission control lines EML1 to EMLn are arranged spaced from one another in the first direction DR1.

The plurality of pixels PX are electrically connected to the initialization scan lines GIL1 to GILn, the compensation scan lines GCL1 to GCLn, the write scan lines GWL1 to GWLn+1, the emission control lines EML1 to EMLn, and the data lines DL1 to DLm. Each of the plurality of pixels PX may be electrically connected with four scan lines. For example, as illustrated in FIG. 1, the first row of pixels may be connected to the first initialization scan line GIL1 the first compensation scan line GCL1, and the first and second write scan lines GWL1 and GWL2. Furthermore, the second row of pixels may be connected to the second initialization scan line GIL2, the second compensation scan line GCL2, and the second and third write scan lines GWL2 and GWL3.

The scan driver 300 may be disposed in a non-display area NDA of the display panel DP. For example, there may be no pixels in the non-display area NDA. The scan driver 300 receives the scan control signal SCS from the driving controller 100. In response to the scan control signal SCS, the scan driver 300 may output initialization scan signals to the initialization scan lines GIL1 to GILn, may output compensation scan signals to the compensation scan lines GCL1 to GCLn, and may output write scan signals to the write scan lines GWL1 to GWLn+1. The circuit configuration and operation of the scan driver 300 will be described in detail later.

The light emitting driver 350 receives the emission driving control signal ECS from the driver controller 100. The light emitting driver 350 may output emission control signals to the emission control lines EML1 to EMLn in response to the emission driving control signal ECS.

The light emitting driver 350 may be disposed in the non-display area NDA of the display panel DP. As an example of the present disclosure, the scan driver 300 is positioned adjacent to one side of the display area DA, and the light emitting driver 350 is positioned adjacent to the other side of the display area DA opposite to the one side. In the example shown in FIG. 1, the scan driver 300 and the light emitting driver 350 are respectively positioned on opposite sides of the display area DA, but the present disclosure is not limited thereto. For example, each of the scan driver 300 and the light emitting driver 350 may be positioned adjacent to one of one side and the other side of the display panel DP.

Alternatively, the scan driver 300 and the light emitting driver 350 may be implemented as one circuit (i.e., an integrated scan driver). In this case, while performing functions of the scan driver 300, the integrated scan driver may also perform the function of the light emitting driver 350 for outputting the emission control signals to the emission control lines EML1 to EMLn.

As an example of the present disclosure, the scan driver 300 may include a plurality of independent scan drivers depending on the type of a scan signal. In detail, the scan driver 300 may include a first scan driver that outputs initialization scan signals, a second scan driver that outputs compensation scan signals, and a third scan driver that outputs write scan signals. At least two of the scan drivers may be integrated into one circuit.

Each of the plurality of pixels PX includes a light emitting element ED (see FIG. 2) and a pixel circuit PXC (see FIG. 2) for controlling the emission of the light emitting element ED. The pixel circuit PXC may include a plurality of transistors and a capacitor. The scan driver 300 and the light emitting driver 350 may include transistors formed through the same process as the pixel circuit PXC.

Each of the plurality of pixels PX receives the first driving voltage ELVDD, the second driving voltage ELVSS, the first initialization voltage VINT1, and the second initialization voltage VINT2 from the voltage generator 400.

Figure 2:
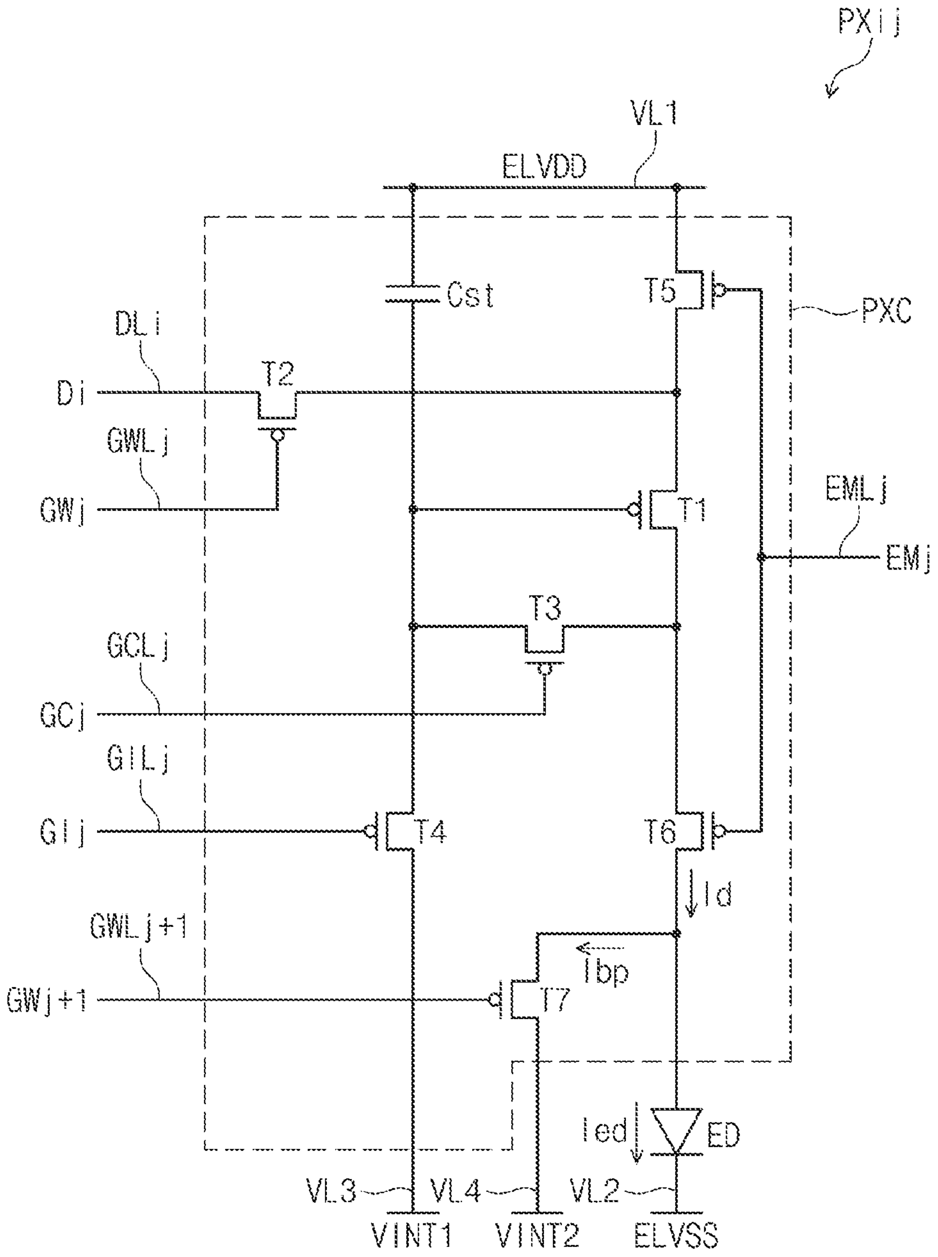
FIG. 2 is a circuit diagram of a pixel according to an embodiment of the present disclosure.
Figure 3:
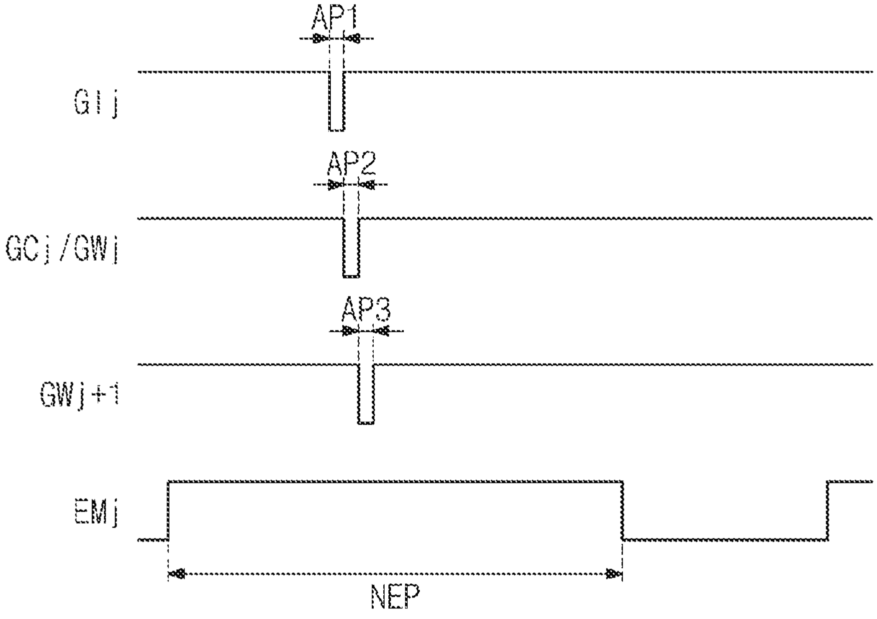
FIG. 3 is a timing diagram for describing an operation of a pixel, according to an embodiment of the present disclosure.

FIG. 2 is a circuit diagram of a pixel according to an embodiment of the present disclosure. FIG. 3 is a timing diagram for describing an operation of a pixel, according to an embodiment of the present disclosure.

An equivalent circuit diagram of one pixel PXij among the plurality of pixels PX illustrated in FIG. 1 is illustrated in FIG. 2 as an example. Below, a circuit structure of the pixel PXij will be described. The plurality of pixels PX has the same structure, and thus, additional description associated with the remaining pixels will be omitted to avoid redundancy. The pixel PXij is connected to an i-th data line DLi (hereinafter referred to as a "data line") of the data lines DL1 to DLm and a j-th emission control line EMLj (hereinafter referred to as an "emission control line") among the emission control lines EML1 to EMLn. The pixel PXij is connected to a j-th initialization scan line GILj (hereinafter, referred to as an "initialization scan line") among the initialization scan lines GIL1 to GILn, a j-th write scan line GWLj (hereinafter, referred to as a "first write scan line") and a (j+1)-th write scan line GWLj+1 (hereinafter, referred to as a "second write scan line") among the write scan lines GWL1 to GWLn+1. Moreover, the pixel PXij is connected to a j-th compensation scan line GCLj (hereinafter, referred to as a "compensation scan line") among the compensation scan lines GCL1 to GCLn. Alternatively, the pixel PXij may be connected to a separate j-th black scan line instead of the (j+1)-th write scan line GWLj+1.

The pixel PXij includes the light emitting element ED and the pixel circuit PXC. The light emitting element ED may include a light emitting diode. The light emitting diode may include an organic light emitting material, an inorganic light emitting material, quantum dots, and quantum rods as a light emitting layer.

The pixel circuit PXC includes first to seventh transistors T1, T2, T3, T4, T5, T6, and T7 and a single capacitor Cst. Each of the first to seventh transistors T1 to T7 may be a transistor having a low-temperature polycrystalline silicon (LTPS) semiconductor layer. All of the first to seventh transistors T1 to T7 may be P-type transistors. However, a configuration of the pixel circuit PXC according to the present disclosure is not limited to an embodiment illustrated in FIG. 2. The pixel circuit PXC illustrated in FIG. 2 is only an example. For example, the configuration of the pixel circuit PXC may be modified and implemented. For example, some of the first to seventh transistors T1 to T7 may be P-type transistors. The other(s) thereof may be N-type transistors. For example, among the first to seventh transistors T1 to T7, the first, second, and fifth to seventh transistors T1, T2, and T5 to T7 are P-type transistors, and the third and fourth transistors T3 and T4 may be N-type transistors by using an oxide semiconductor as a semiconductor layer.

The initialization scan line GILj may deliver a j-th initialization scan signal GIj (hereinafter referred to as an "initialization scan signal") to the pixel PXij, and the compensation scan line GCLj may deliver a j-th compensation scan signal GCj (hereinafter referred to as a "compensation scan signal") to the pixel PXij. The first write scan line GWLj may deliver a j-th write scan signal GWj (hereinafter referred to as a "write scan signal") to the pixel PXij, and the second write scan line GWLj+1 may deliver a (j+1)-th write scan signal GWj+1 (hereinafter referred to as a "black scan signal") to the pixel PXij. The emission control line EMLj may deliver a j-th emission control signal EMj (hereinafter referred to as an "emission control signal") to the pixel PXij, and the data line DLi delivers a data signal Di to the pixel PXij. The data signal Di may have a voltage level corresponding to a grayscale of the corresponding image data among the image data DATA provided to the data driver 200. First to fourth driving voltage lines VL1, VL2, VL3, and VL4 may deliver the first driving voltage ELVDD, the second driving voltage ELVSS, the first initialization voltage VINT1, and the second initialization voltage VINT2 to the pixel PXij, respectively.

The first transistor T1 includes a first electrode connected with the first driving voltage line VL1 through the fifth transistor T5, a second electrode electrically connected with an anode of the light emitting element ED through the sixth transistor T6, and a gate electrode connected with one end of the capacitor Cst. The first transistor T1 may receive the data signal Di delivered through the data line DLi depending on the switching operation of the second transistor T2 and then may supply a driving current Id to the light emitting element ED.

The second transistor T2 includes a first electrode connected to the data line DLi, a second electrode connected to the first electrode of the first transistor T1, and a gate electrode connected to the first write scan line GWLj. The second transistor T2 may be turned on in response to the write scan signal GWj received through the first write scan line GWLj and may deliver the data signal Di delivered from the data line DLi to the first electrode of the first transistor T1.

The third transistor T3 includes a first electrode connected to the second electrode of the first transistor T1, a second electrode connected to the gate electrode of the first transistor T1, and a gate electrode connected to the compensation scan line GCLj. The third transistor T3 may be turned on in response to the compensation scan signal GCj transferred through the compensation scan line GCLj, and thus, the gate electrode and the second electrode of the first transistor T1 may be connected, that is, the first transistor T1 may be diode-connected. The fourth transistor T4 includes a first electrode connected to the third driving voltage line VL3 through which the first initialization voltage VINT1 is supplied, a second electrode connected to the gate electrode of the first transistor T1, and a gate electrode connected to the initialization scan line GILj. The fourth transistor T4 may be turned on in response to the initialization scan signal GIj transferred through the initialization scan line GILj such that the first initialization voltage VINT1 is transferred to the gate electrode of the first transistor T1. As such, a voltage of the gate electrode of the first transistor T1 may be initialized. This operation may be referred to as an "an initialization operation".

The fifth transistor T5 includes a first electrode connected to the first driving voltage line VL1, a second electrode connected to the first electrode of the first transistor T1, and a gate electrode connected to the emission control line EMLj.

The sixth transistor T6 includes a first electrode connected to the second electrode of the first transistor T1, a second electrode connected to the anode of the light emitting element ED, and a gate electrode connected to the emission control line EMLj.

The fifth transistor T5 and the sixth transistor T6 are simultaneously turned on in response to the emission control signal EMj received through the emission control line EMLj. The first driving voltage ELVDD applied through the fifth transistor T5 thus turned on may be compensated through the diode-connected first transistor T1 and then may be delivered to the light emitting element ED.

The seventh transistor T7 includes a first electrode connected to the fourth driving voltage line VL4 through which the second initialization voltage VINT2 is supplied, a second electrode connected to the second electrode of the sixth transistor T6, and a gate electrode connected to the second write scan line GWLj+1.

The first end of the capacitor Cst is connected with the gate electrode of the first transistor T1 as described above, and a second end of the capacitor Cst is connected with the first driving voltage line VL1. The cathode of the light emitting element ED may be connected to the second driving voltage line VL2, through which the second driving voltage ELVSS is delivered.

Referring to FIGS. 2 and 3, the emission control signal EMj has a high level during a non-emission period NEP. During the non-emission period NEP, the initialization scan signal GIj is activated. During an activation period AP1 (hereinafter, referred to as a "first activation period") of the initialization scan signal GIj, when the initialization scan signal GIj of a low level is provided through the initialization scan line GILj, the fourth transistor T4 is turned on in response to the initialization scan signal GIj of the low level. The first initialization voltage VINT1 is delivered to the gate electrode of the first transistor T1 through the turned-on fourth transistor T4, and the gate electrode of the first transistor T1 is initialized to the first initialization voltage VINT1. Accordingly, the first activation period AP1 may be defined as an initialization period of the pixel PXij.

Then, the compensation scan signal GCj and the write scan signal GWj are activated. The compensation scan signal GCj and the write scan signal GWj may be simultaneously activated during a second activation period AP2. In an example embodiment of the present disclosure, the first activation period AP1 does not overlap the second activation period AP2. When the compensation scan signal GCj having a low level is supplied through the compensation scan line GCLj, the third transistor T3 is turned on. The first transistor T1 is diode-connected by the third transistor T3 thus turned on to be forward-biased. During the second activation period AP2, the second transistor T2 is turned on by the write scan signal GWj of the low level. Then, a compensation voltage "Di-Vth" obtained by reducing the voltage of the data signal Di supplied from the data line DLi by a threshold voltage Vth of the first transistor T1 is applied to the gate electrode of the first transistor T1. That is, the potential of the gate electrode of the first transistor T1 may be the compensation voltage "Di-Vth".

The first driving voltage ELVDD and the compensation voltage "Di-Vth" may be respectively applied to opposite ends of the capacitor Cst, and charges corresponding to a voltage difference between the opposite ends of the capacitor Cst may be stored in the capacitor Cst. Here, the second activation period AP2 may be referred to as a compensation period or a write period of the pixel PXij.

The black scan signal GWj+1 has a low level during a third activation period AP3. In an example embodiment of the present disclosure, the third activation period AP3 does not overlap the second activation period AP2. During the third activation period AP3, the seventh transistor T7 is turned on by receiving the black scan signal GWj+1 of a low level through the second write scan line GWLj+1. A part of the driving current Id may be drained through the seventh transistor T7 as a bypass current Ibp. When the seventh transistor T7 is turned on in response to the black scan signal GWj+1, the anode may be initialized to the second initialization voltage VINT2.

In the case where the pixel PXij displays a black image, when the light emitting element ED emits light even though the minimum driving current of the first transistor T1 flows as the driving current Id, the pixel PXij may not normally display a black image. For example, a color brighter or different than black may be perceivable when viewing the pixel PXij when the pixel PXij is not normally displaying the black image. Accordingly, the seventh transistor T7 in the pixel PXij according to an embodiment of the present disclosure may drain (or disperse) a part of the minimum driving current of the first transistor T1 to a current path, which is different from a current path to the light emitting element ED, as the bypass current Ibp. Here, the minimum driving current of the first transistor T1 means the current flowing into the first transistor T1 under the condition that the first transistor T1 is turned off because the gate-source voltage Vgs of the first transistor T1 is less than the threshold voltage Vth. As the minimum driving current (e.g., a current of 10 pA or less) flowing to the first transistor T1 is transferred to the light emitting element ED under the condition that the first transistor T1 is turned off, an image of a black gray scale is displayed. When the pixel PXij displays a black image, the bypass current Ibp has a relatively large influence on the minimum driving current. On the other hand, when the pixel PXij displays an image such as a normal image or a white image, the bypass current Ibp has little effect on the driving current Id. Accordingly, when a black image is displayed, a current (i.e., the light emitting current Ted) that corresponds to a result of subtracting the bypass current Ibp flowing through the seventh transistor T7 from the driving current Id is provided to the light emitting element ED, and thus a black image may be clearly displayed. Accordingly, the pixel PXij may implement an accurate black grayscale image by using the seventh transistor T7, and thus a contrast ratio may be increased.

Next, the emission control signal EMj supplied from the emission control line EMLj is changed from a high level to a low level. The fifth transistor T5 and the sixth transistor T6 are turned on by the emission control signal EMj having a low level. In this case, the driving current Id according to a voltage difference between the voltage of the gate electrode of the first transistor T1 and the first driving voltage ELVDD is generated and supplied to the light emitting element ED through the sixth transistor T6, and the current Ted flows through the light emitting element ED.

Figure 4A:
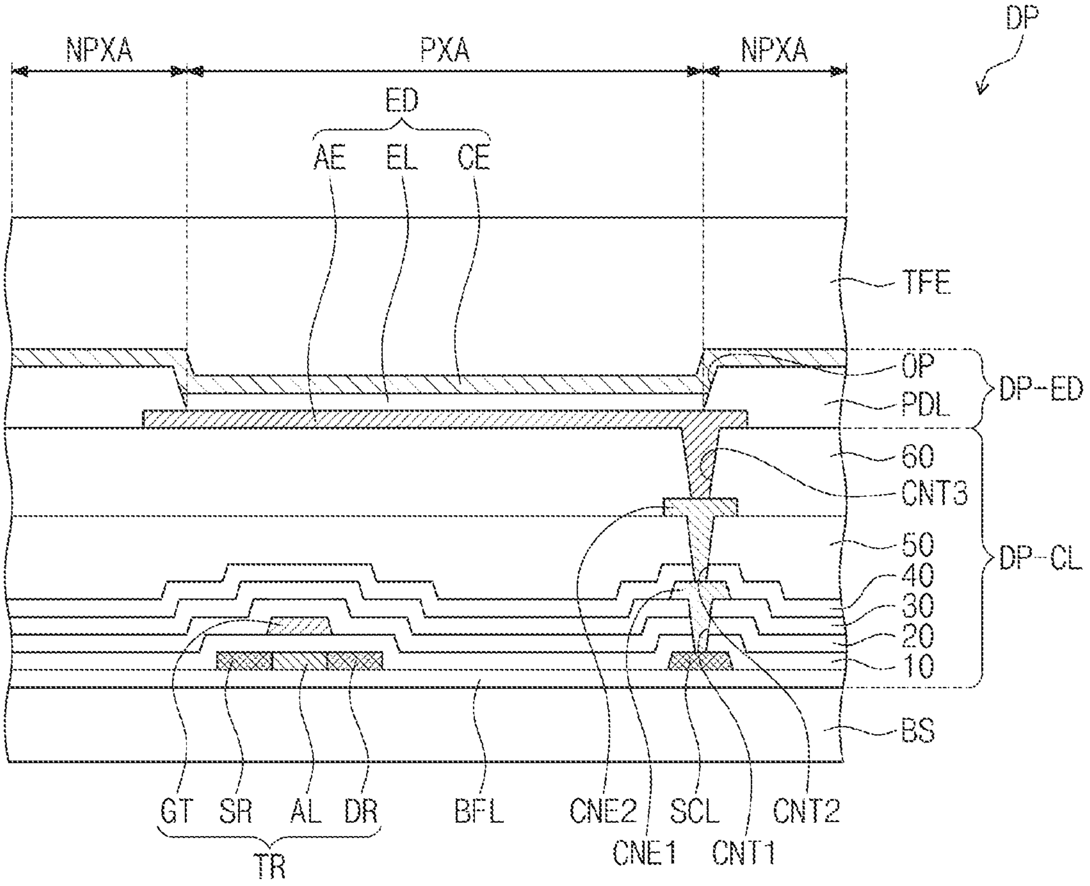
FIG. 4A is a cross-sectional view of a pixel, according to an embodiment of the present disclosure.

FIG. 4A is a cross-sectional view of a pixel, according to an embodiment of the present disclosure.

Referring to FIG. 4A, the display panel DP may include a base layer BS. For example, the base layer BS may be a substrate. At least one inorganic layer may be formed on an upper surface of the base layer BS. The inorganic layer may include at least one of aluminum oxide, titanium oxide, silicon oxide, silicon nitride, silicon oxynitride, zirconium oxide, and hafnium oxide. The inorganic layer may be formed of multiple layers. The multiple inorganic layers may constitute a barrier layer and/or a buffer layer. In an embodiment, it is illustrated that the display panel DP includes a buffer layer BFL.

The buffer layer BFL may improve a bonding force between the base layer BS and a semiconductor pattern. The buffer layer BFL may include at least one of silicon oxide, silicon nitride, and silicon oxynitride. For example, the buffer layer BFL may include a structure in which a silicon oxide layer and a silicon nitride layer are stacked alternately.

The semiconductor pattern may be disposed on the buffer layer BFL. The semiconductor pattern may include polysilicon. However, embodiments of the disclosure are not limited thereto. For example, the semiconductor pattern may include amorphous silicon, low-temperature polycrystalline silicon, or an oxide semiconductor.

FIG. 4A only illustrates a part of the semiconductor pattern, and the semiconductor pattern may be further disposed in another area. The semiconductor patterns may be arranged across pixels according to a specific rule. The semiconductor pattern may have an electrical property different depending on whether it is doped or not. The semiconductor pattern may include a first area having high conductivity and a second area having low conductivity. The first area may be doped with an N-type dopant or a P-type dopant. A P-type transistor may include a doping area doped with the P-type dopant, and an N-type transistor may include a doping area doped with the N-type dopant. The second area may be an undoped area or an area doped with a concentration lower than a concentration in the first area.

In an embodiment, a conductivity of the first area is greater than a conductivity of the second area. The first area may substantially serves as an electrode or a signal wire. The second area may correspond to a channel area of a transistor substantially. In other words, a part of the semiconductor pattern may be a channel part of the transistor. Another part thereof may be a source part or drain part of the transistor. Another part may be a connection electrode or a connection signal wire.

FIG. 4A illustrates the light emitting element ED and one transistor TR among the transistors T1 to T7 included in the pixel PXij (see FIG. 2).

A source portion SR, a channel portion AL, and a drain portion DR of the transistor TR may be formed from a semiconductor pattern. The source portion SR and the drain portion DR may extend in opposite directions from the channel portion AL on the cross-section. A portion of a connection signal wire SCL formed from the semiconductor pattern is illustrated in FIG. 4A. Although not separately illustrated, the connection signal wire SCL may be connected to the drain portion DR of the transistor TR on a plane.

A first insulating layer 10 may be disposed on the buffer layer BFL. The first insulating layer 10 may overlap a plurality of pixels in common and may cover the semiconductor pattern. The first insulating layer 10 may be an inorganic layer and/or an organic layer, and may have a single-layer or multi-layer structure. The first insulating layer 10 may include at least one of aluminum oxide, titanium oxide, silicon oxide, silicon nitride, silicon oxynitride, zirconium oxide, and hafnium oxide. In an embodiment, the first insulating layer 10 may be a single silicon oxide layer. Not only the first insulating layer 10 but also an insulating layer of a circuit layer DP-CL to be described later may be inorganic layers and/or organic layers, and may have a single layer structure or a multi-layer structure. The inorganic layer may include at least one of the above-described materials, but is not limited thereto.

A gate GT of the transistor TR is disposed on the first insulating layer 10. The gate GT may be a part of a metal pattern. The gate GT overlaps the channel part AL. For example, the gate GT may overlap the channel part AL in a plan view. In a process of doping the semiconductor pattern, the gate GT may function as a mask.

A second insulating layer 20 is disposed on the first insulating layer 10 and may cover the gate GT. The second insulating layer 20 may overlap pixels in common. For example, a single layer of the second insulating layer 20 may overlap two or more pixels. The second insulating layer 20 may be an inorganic layer and/or an organic layer, and may have a single-layer structure or a multi-layer structure. The second insulating layer 20 may include at least one of silicon oxide, silicon nitride, and silicon oxynitride. In an embodiment, the second insulating layer 20 may have a multi-layer structure including a silicon oxide layer and a silicon nitride layer.

A third insulating layer 30 may be disposed on the second insulating layer 20. The third insulating layer 30 may have a single layer structure or a multi-layer structure. For example, the third insulating layer 30 may have a multi-layer structure including a silicon oxide layer and a silicon nitride layer.

A first connection electrode CNE1 may be disposed on the third insulating layer 30. The first connection electrode CNE1 may be connected to the connection signal wire SCL through a first contact hole CNT1 penetrating the first, second, and third insulating layers 10, 20, and 30.

A fourth insulating layer 40 may be disposed on the third insulating layer 30. The fourth insulating layer 40 may be a single silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 through a second contact hole CNT2 penetrating the fourth insulating layer 40 and the fifth insulating layer 50.

A sixth insulating layer 60 may be disposed on the fifth insulating layer 50 and may cover the second connection electrode CNE2. The sixth insulating layer 60 may be an organic layer.

A light emitting element layer DP-ED may be disposed on the circuit layer DP-CL. The light emitting element layer DP-ED may include the light emitting element ED. For example, the light emitting element layer DP-ED may include an organic light emitting material, an inorganic light emitting material, a quantum dot, a quantum rod, a micro-LED, or a nano-LED. Hereinafter, it is described that the light emitting element ED is an organic light emitting element, but is not particularly limited thereto.

The light emitting element ED may include a first electrode AE (or an anode), a light emitting layer EL, and a second electrode CE (or a cathode).

The first electrode AE may be disposed on the sixth insulating layer 60. The first electrode AE may be connected to the second connection electrode CNE2 through a third contact hole CNT3 penetrating the sixth insulating layer 60.

A pixel defining layer PDL may be disposed on the sixth insulating layer 60 and may cover a portion of the first electrode AE. An opening OP is defined on the pixel defining layer PDL. The opening OP of the pixel defining layer PDL exposes at least part of the first electrode AE.

The display area DA (see FIG. 1) may include an emission area PXA and a non-emission area NPXA adjacent to the emission area PXA. The non-emission area NPXA may surround the emission area PXA. In an embodiment, the light emitting area PXA is defined to correspond to a partial area of the first electrode AE exposed by the opening OP.

The light emitting layer EL may be disposed on the first electrode AE. The light emitting layer EL may be disposed in an area defined by the opening OP. That is, the light emitting layer EL may be separately formed on each of the pixels PX (see FIG. 1). When the plurality of light emitting layers EL are separately formed in each of the pixels PX, each of the light emitting layers EL may emit light of at least one of a blue color, a red color, and a green color. However, embodiments of the disclosure are not limited thereto. For example, the light emitting layers EL may be connected to one another and may be provided to each of the pixels PX in common. In this case, the light emitting layer EL provided in common to the plurality of pixels PX may provide blue light or white light.

The second electrode CE may be disposed on the light emitting layer EL. The plurality of second electrodes CE may be separately formed in each of the plurality of pixels PX. Alternatively, the plurality of second electrodes CE may be connected to each other and may be disposed in common in the plurality of pixels PX.

A hole control layer may be interposed between the first electrode AE and the light emitting layer EL. The hole control layer may be disposed in common in the emission area PXA and the non-emission area NPXA. The hole control layer may include a hole transport layer and may further include a hole injection layer. An electron control layer may be interposed between the light emitting layer EL and the second electrode CE. The electron control layer may include an electron transport layer, and may further include an electron injection layer. The hole control layer and the electron control layer may be formed, in common, in the plurality of pixels PX by using an open mask.

An encapsulation layer TFE may be disposed on the light emitting element layer DP-ED. The encapsulation layer TFE may include an inorganic layer, an organic layer, and an inorganic layer, which are sequentially stacked, but layers constituting the encapsulation layer TFE are not limited thereto.

The inorganic layers may protect the light emitting element layer DP-ED from moisture and oxygen; the organic layer may protect the light emitting element layer DP-ED from foreign objects such as dust particles. The inorganic layers may include a silicon nitride layer, a silicon oxynitride layer, a silicon oxide layer, a titanium oxide layer, an aluminum oxide layer, or the like. The organic layer may include an acrylate-based organic layer, but is not limited thereto.

Figure 4B:
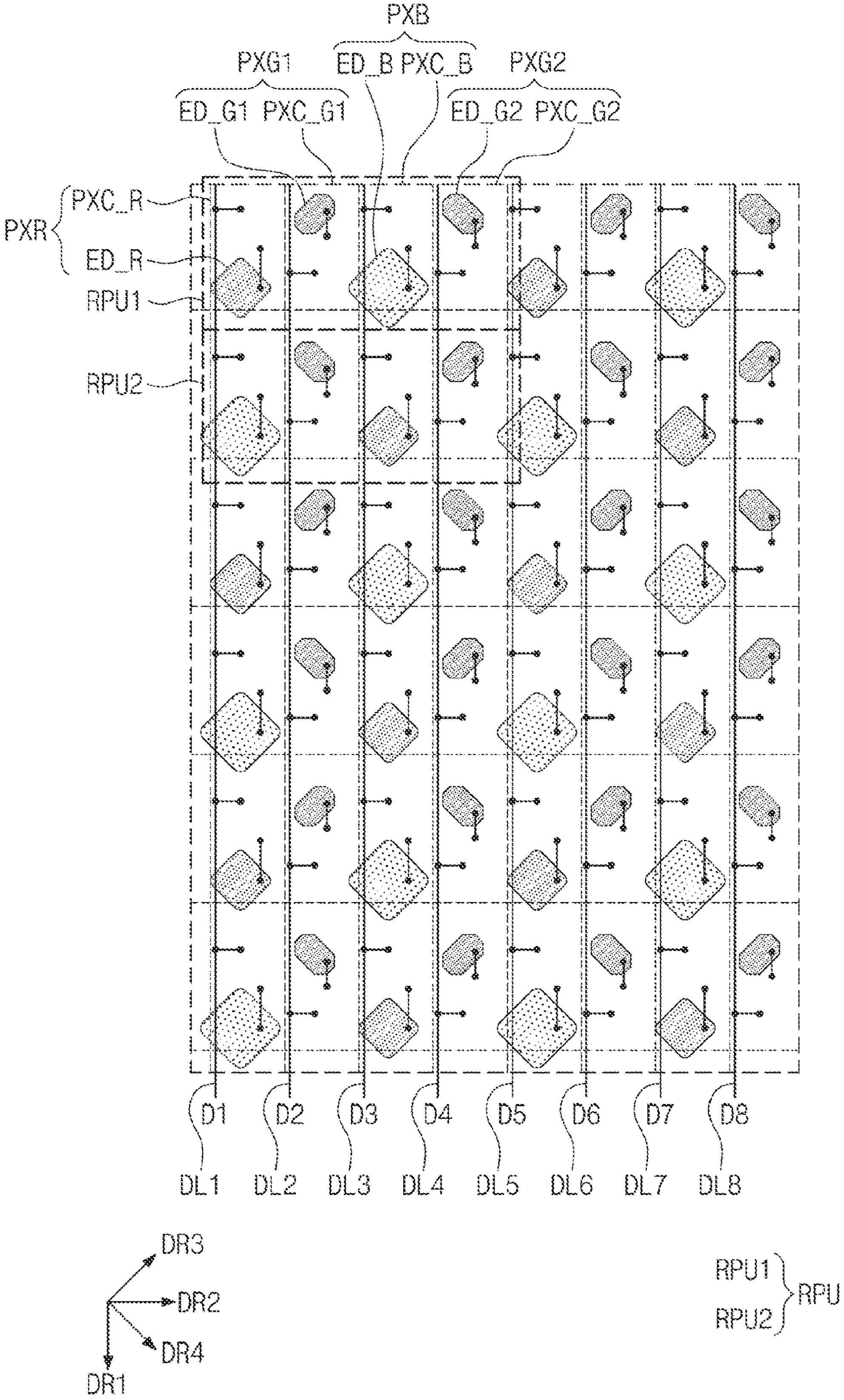
FIG. 4B is a plan view illustrating a layout of pixels, according to an embodiment of the present disclosure.

FIG. 4B is a plan view illustrating a layout of pixels, according to an embodiment of the present disclosure.

Referring to FIG. 4B, the pixels PX provided in the display panel DP may be grouped into a plurality of reference pixel units RPU. As an example of the present disclosure, each of the reference pixel units RPU may include four pixels, for example, two first pixels PXG1 and PXG2 (hereinafter, referred to as "first and second green pixels"), a third pixel PXR (hereinafter, referred to as a "red pixel"), and a fourth pixel PXB (hereinafter, referred to as a "blue pixel"). However, the number of pixels included in each of the reference pixel units RPU is not limited thereto. Alternatively, each of the reference pixel units RPU may include three pixels: the first green pixel PXG1 (or the second green pixel PXG2), the red pixel PXR, and the blue pixel PXB.

The first and second green pixels PXG1 and PXG2 include first and second light emitting elements ED_G1 and ED_G2 (hereinafter, referred to as "first and second green light emitting elements"), respectively. The red pixel PXR includes a third light emitting element ED_R (hereinafter, referred to as a "red light emitting element"), and the blue pixel PXB includes a fourth light emitting element ED_B (hereinafter, referred to as a "blue light emitting element"). As an example of the present disclosure, each of the first and second green light emitting elements ED_G1 and ED_G2 outputs first color light (e.g., green light). The red light emitting element ED_R outputs second color light (e.g., red light) different from the first color light, and the blue light emitting element ED_B outputs third color light (e.g., blue light) different from the first and second color light. The green light output from the first green light emitting element ED_G1 may have the same wavelength band as the green light output from the second green light emitting element ED_G2.

In the first and second directions DR1 and DR2, the red light emitting elements ED_R and the blue light emitting elements ED_B may be arranged alternately and repeatedly. The first and second green light emitting elements ED_G1 and ED_G2 are alternately and repeatedly arranged in the first direction DR1 and alternately and repeatedly arranged in the second direction DR2. Here, a column may be a direction parallel to the first direction DR1, and a row may be a direction parallel to the second direction DR2. In detail, in an odd pixel column, the red light emitting elements ED_R and the blue light emitting elements ED_B are alternately arranged in the first direction DR1. In the even pixel column, the first and second green light emitting elements ED_G1 and ED_G2 are alternately arranged in the first direction DR1.

In an example embodiment of the present disclosure, the red light emitting element ED_R has a size greater than the first and second green light emitting elements ED_G1 and ED_G2. Moreover, the blue light emitting element ED_B may have a size greater than or equal to that of the red light emitting element ED_R. The size of each of the light emitting elements ED_R, ED_G1, ED_G2, and ED_B is not limited thereto, and may be variously modified and applied. For example, in another embodiment of the present disclosure, the light emitting elements ED_R, ED_G1, ED_G2, and ED_B have the same size.

In an example embodiment of the present disclosure, each of the red and blue light emitting elements ED_R and ED_B has a rounded rhombus shape. However, the shape of each of the red and blue light emitting elements ED_R and ED_B is not limited thereto. For example, each of the red and blue light emitting elements ED_R and ED_B may have an octagonal shape having the same length in the first direction DR1 and the second direction DR2, or may have one of a square shape and a rectangular shape.

The first and second green light emitting elements ED_G1 and ED_G2 may have different shapes from the red and blue light emitting elements ED_R and ED_B. For example, the first and second green light emitting elements ED_G1 and ED_G2 may have an octagonal shape. As an example of the present disclosure, the first green light emitting element ED_G1 may have an octagonal shape elongated in a third direction DR3 and inclined in the third direction DR3. The second green light emitting element ED_G2 may have an octagonal shape elongated in a fourth direction DR4 and inclined in the fourth direction DR4. Here, the third direction DR3 may be a direction perpendicular to the fourth direction DR4.

The first and second green pixels PXG1 and PXG2 may include first and second green pixel circuits PXC_G1 and PXC_G2 respectively. The red pixel PXR may include a red pixel circuit PXC_R, and the blue pixel PXB may include a blue pixel circuit PXC_B. In an embodiment, in FIG. 4B, the first and second green pixel circuits PXC_G1 and PXC_G2, the red pixel circuit PXC_R, and the blue pixel circuit PXC_B are separately illustrated by using dotted lines. The first and second green pixel circuits PXC_G1 and PXC_G2 are connected to the first and second green light emitting elements ED_G1 and ED_G2, respectively. The red and blue pixel circuits PXC_R and PXC_B are connected to the red and blue light emitting elements ED_R and ED_B, respectively. When viewed from above a plane or in a plan view, the first and second green pixel circuits PXC_G1 and PXC_G2 may respectively overlap the first and second green light emitting elements ED_G1 and ED_G2, and the red and blue pixel circuits PXC_R and PXC_B may respectively overlap the red and blue light emitting elements ED_R and ED_B.

In an example embodiment of the present disclosure, each of the reference pixel units RPU is connected to four data lines. For example, each of the reference pixel units RPU positioned in a first reference column may be connected to first to fourth data lines DL1, DL2, DL3, and DL4. Each of the reference pixel units RPU positioned in a second reference column may be connected to fifth to eighth data lines DL5, DL6, DL7, and DL8. For example, a reference pixel unit RPU in a first row and a first reference column may include pixels PXR, PXG1, PXG2, and PXB. Hereinafter, for convenience of description, the reference pixel units RPU positioned in the first reference column will be mainly described. Among the reference pixel units RPU located in the first reference column, a reference pixel unit arranged in an odd reference row is referred to as a "first reference pixel unit" RPU1, and a reference pixel unit arranged in an even reference row is referred to as a "second reference pixel unit" RPU2.

The red pixel circuit PXC_R of the first reference pixel unit RPU1 is connected to the first data line DL1, and the blue pixel circuit PXC_B of the first reference pixel unit RPU1 is connected to the third data line DL3. The first and second green pixel circuits PXC_G1 and PXC_G2 of the first reference pixel unit RPU1 are connected to the second and fourth data lines DL2 and DL4 respectively. The red pixel circuit PXC_R of the second reference pixel unit RPU2 is connected to the third data line DL3 and the blue pixel circuit PXC_B of the second reference pixel unit RPU2 is connected to the first data line DL1. The first and second green pixel circuits PXC_G1 and PXC_G2 of the second reference pixel unit RPU2 are connected to the fourth and second data lines DL4 and DL2, respectively.

The first to eighth data signals D1 to D8 may be supplied to the first to eighth data lines DL1 to DL8, respectively. The red pixel RXR and the blue pixel RXB may be alternately connected to the first data line DL1. Accordingly, the first data signal D1 supplied to the first data line DL1 may include a red data signal and a blue data signal to be respectively supplied to the red pixel RXR and the blue pixel RXB. The first and second green pixels PXG1 and PXG2 may be alternately connected to the second data line DL2. Accordingly, the second data signal D2 supplied to the second data line DL2 may include first and second green data signals to be respectively supplied to the first and second green pixels PXG1 and PXG2. The third data signal D3 supplied to the third data line DL3 may include a red data signal and a blue data signal to be respectively supplied to the red pixel RXR and the blue pixel RXB. The fourth data signal D4 supplied to the fourth data line DL4 may include first and second green data signals to be respectively supplied to the first and second green pixels PXG1 and PXG2.

As pieces of color information of the data signals D1 to D8 respectively applied to the data line DL1 to DL8 are frequently changed, the power consumed by the data driver 200 (see FIG. 1) may increase. Hereinafter, a driving method for reducing the number of times that the pieces of color information of the data signals D1 to D8 respectively applied to the data line DL1 to DL8 are changed will be described in detail with reference to FIGS. 5 to 7C.

Figure 5:
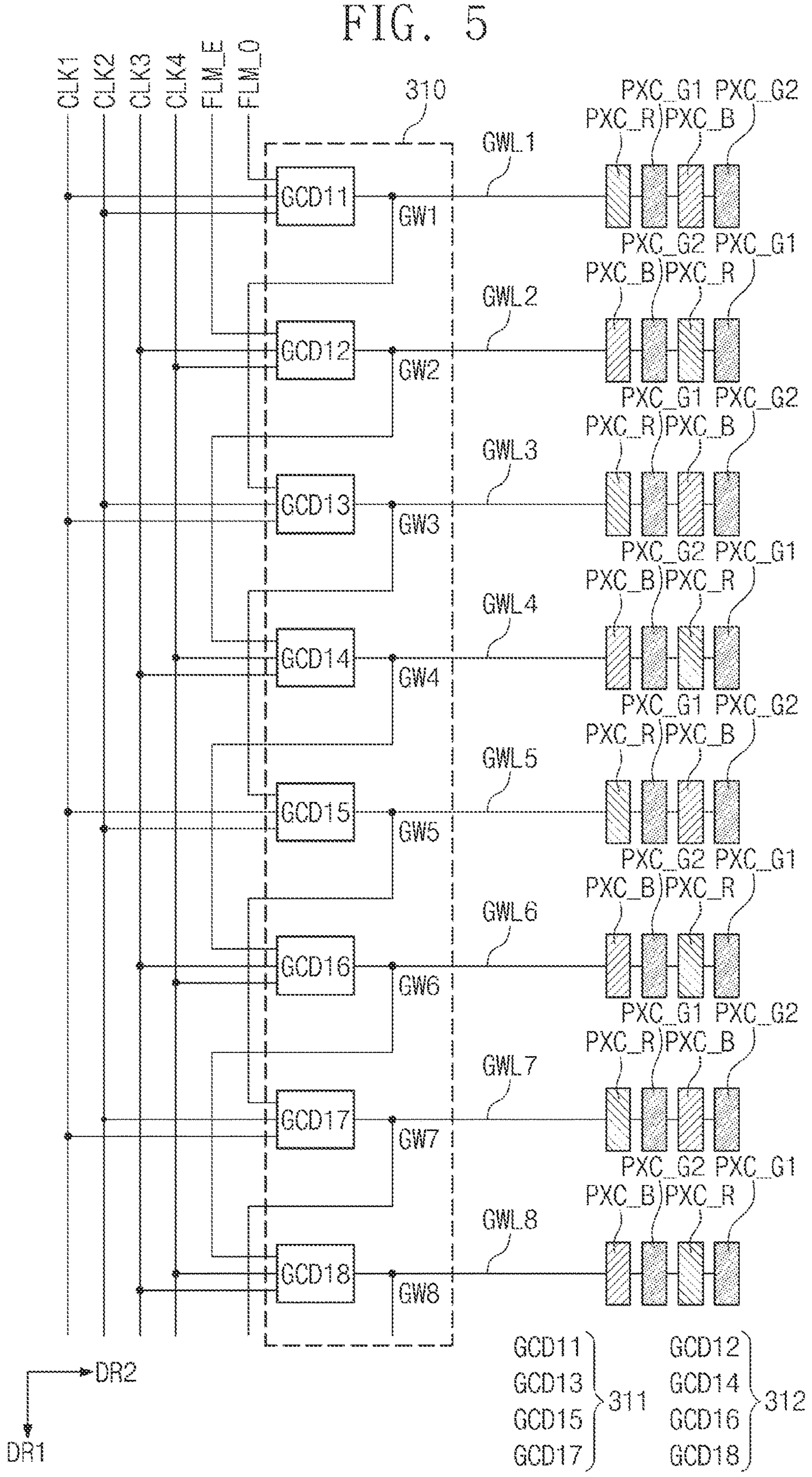
FIG. 5 is a block diagram illustrating a scan driver, according to an embodiment of the present disclosure.
Figure 6:
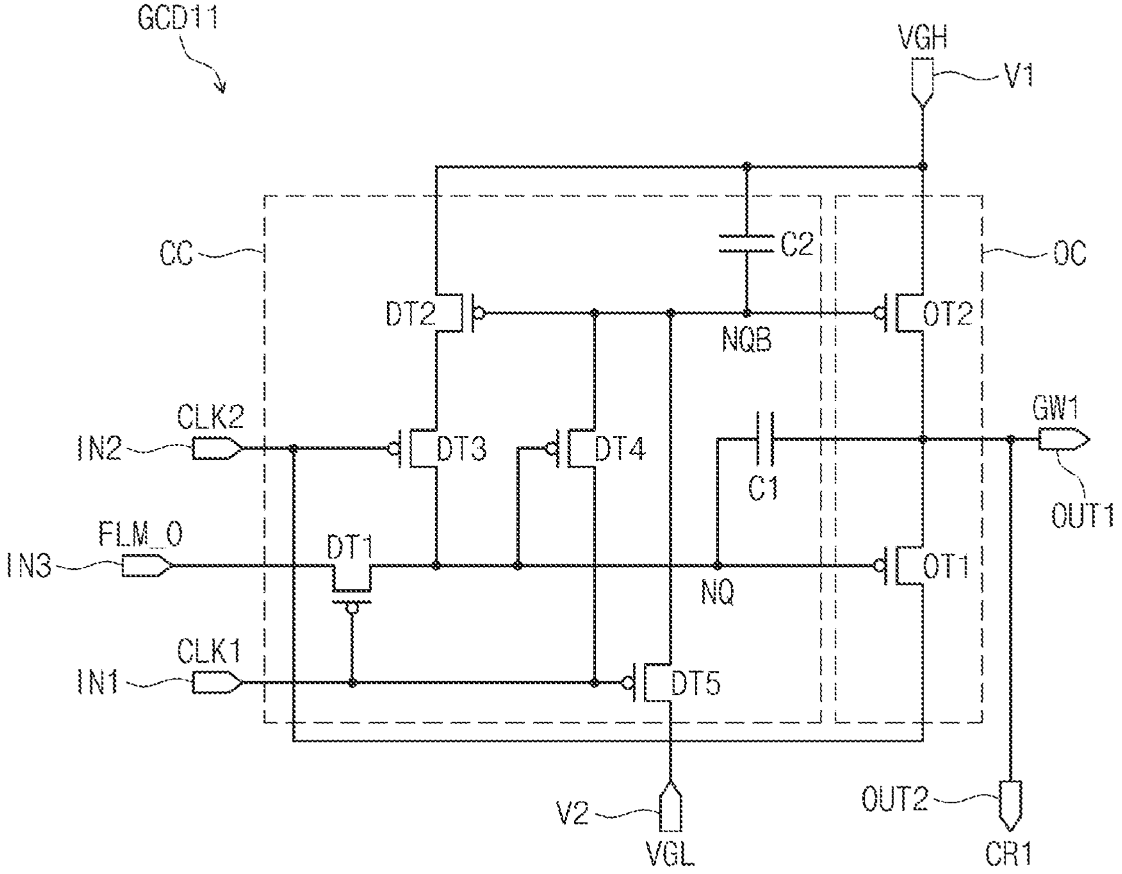
FIG. 6 is a circuit diagram of a driving stage, according to an embodiment of the present disclosure.

FIG. 5 is a block diagram illustrating a scan driver, according to an embodiment of the present disclosure. FIG. 6 is a circuit diagram of a driving stage, according to an embodiment of the present disclosure.

FIG. 5 representatively illustrates a third scan driver 310 for outputting write scan signals GW1 to GW8 among a plurality of scan drivers included in the scan driver 300 shown in FIG. 1. The structure and operation of the third scan driver 310 are similar to those of the first and second scan drivers, and thus the description of the structure and operations of the first and second scan drivers is replaced with the description of the structure and operation of the third scan driver 310.

Referring to FIG. 5, the third scan driver 310 includes a plurality of write stages (hereinafter referred to as "driving stages"). FIG. 5 shows only eight driving stages (i.e., first to eighth driving stages GCD11 to GCD18) among a plurality of driving stages as an example. For example, more or less than eight driving stages GCD11 to GCD18 may be present in other embodiments. Each of the driving stages may be implemented by a driving circuit. The first to eighth driving stages GCD11 to GCD18 may output the first to eighth write scan signals GW1 to GW8 to first to eighth write scan lines GWL1 to GWL8, respectively. Each of the first to eighth write scan lines GWL1 to GWL8 may be connected to the first and second green pixel circuits PXC_G1 and PXC_G2 and the red and blue pixel circuits PXC_R and PXC_B.

The first scan driver may include a plurality of initialization stages, which respectively output a plurality of initialization scan signals. The second scan driver may include a plurality of compensation stages, which respectively output a plurality of compensation scan signals. When the first and second scan drivers are integrated with an integrated scan driver, the integrated scan driver includes a plurality of integrated stages, each of which is capable of outputting an initialization scan signal and a compensation scan signal.

The third scan driver 310 includes a first sub-scan driver 311 including the odd driving stages GCD11, GCD13, GCD15, and GCD17 among the plurality of driving stages GCD11 to GCD18, and a second sub-scan driver 312 including the even driving stages GCD12, GCD14, GCD16, and GCD18 among the plurality of driving stages GCD11 to GCD18.

The first sub-scan driver 311 receives a first start signal FLM_O and first and second clock signals CLK1 and CLK2 (or odd clock signals). The second sub-scan driver 312 receives a second start signal FLM_E and third and fourth clock signals CLK3 and CLK4 (or even clock signals). The first start signal FLM_O is applied to the first odd driving stage GCD11 among the odd driving stages GCD11, GCD13, GCD15, and GCD17. The second start signal FLM_E is applied to the first even driving stage GCD12 among the even driving stages GCD12, GCD14, GCD16, and GCD18. In an embodiment, the first and second start signals FLM_O and FLM_E and the first to fourth clock signals CLK1, CLK2, CLK3, and CLK4 are included in the scan control signal SCS provided by the scan driver 300 provided from the driving controller 100 shown in FIG. 1.

Each of the odd driving stages GCD11, GCD13, GCD15, and GCD17 receives the first clock signal CLK1, the second clock signal CLK2, and an odd carry signal. In an example embodiment of the present disclosure, the odd carry signal is a write scan signal output from the previous odd driving stage. For example, the first odd driving stage GCD11 may receive the first start signal FLM_O as an odd carry signal. The second odd driving stage GCD13 may receive the first write scan signal GW1 output from the first odd driving stage GCD11 as the odd carry signal.

Each of the even driving stages GCD12, GCD14, GCD16, and GCD18 receives the third clock signal CLK3, the fourth clock signal CLK4, and an even carry signal. In an example embodiment of the present disclosure, the even carry signal is a write scan signal output from a previous even driving stage. For example, the first even driving stage GCD12 may receive the second start signal FLM_E as an even carry signal. The second even driving stage GCD14 may receive the second write scan signal GW2 output from the first even driving stage GCD12 as the even carry signal.

The odd driving stages GCD11, GCD13, GCD15, and GCD17 may sequentially output 'k' odd write scan signals by sequentially operating in units of 'k' driving stages. Here, l' may be an integer of 2 or more. For example, when 'k' is 3, the odd driving stages GCD11, GCD13, and GCD15 may sequentially operate to sequentially output the first, third, and fifth write scan signals GW1, GW3, and GW5.

The even driving stages GCD12, GCD14, GCD16, and GCD18 may sequentially operate in units of 'k' driving stages to sequentially output 'k' even write scan signals. For example, when 'k' is 3, the even driving stages GCD12, GCD14, and GCD16 may sequentially operate to sequentially output the second, fourth, and sixth write scan signals GW2, GW4, and GW6. The output order of the first to eighth write scan signals GW1 to GW8 will be described in detail later with reference to FIGS. 7A to 7C.

FIG. 6 representatively shows an internal circuit of the first odd driving stage GCD11. Because each of internal circuits of the remaining driving stages GCD12 to GCD18 are similar to an internal circuit of the first odd driving stage GCD11, except that received signals are different from each other, the description of the remaining driving stages GCD12 to GCD18 is replaced with the description of the structure and operation of the first odd driving stage GCD11.

Referring to FIGS. 5 and 6, the first odd driving stage GCD11 is connected to first to third input terminals IN1, IN2, and IN3, first and second voltage terminals V1 and V2, and first and second output terminals OUT1 and OUT2. The first and second clock signals CLK1 and CLK2 are respectively applied to the first and second input terminals IN1 and IN2. The first and second clock signals CLK1 and CLK2 may have a predetermined phase difference. The clock signals input to the first and second input terminals IN1 and IN2 may be inverted in units of one odd driving stage. For example, when the first and second clock signals CLK1 and CLK2 are input to the first and second input terminals IN1 and IN2 of the first odd driving stage GCD11, the second and first clock signals CLK2 and CLK1 may be input to the first and second input terminals IN1 and IN2 of the second odd driving stage GCD13. For example, the second clock signal CLK2 may be input to the first input terminal IN1 of the second odd driving stage GCD13 and the first clock signal CLK1 may be input to the second input terminal IN2 of the second odd driving stage GCD13.

The first start signal FLM_O may be input to the third input terminal IN3 of the first odd driving stage GCD11. The carry signal output from the previous driving stage may be supplied to the third input terminal IN3 instead of the first start signal FLM_O. For example, the carry signal CR1 output from the first odd driving stage GCD11 may be supplied to the third input terminal IN3 of the second odd driving stage GCD13.

A first voltage VGH is applied to the first voltage terminal V1, and a second voltage VGL is applied to the second voltage terminal V2. Herein, the second voltage VGL may have a lower voltage level than the first voltage VGH. The first output terminal OUT1 may output the first write scan signal GW1. The second output terminal OUT2 may output a first carry signal CR1. The first carry signal CR1 may be the same or substantially the same as the first write scan signal GW1. In an example embodiment of the present disclosure, the first write scan signal GW1 has a same level as the second voltage VGL during an activation period and has the same level as the first voltage VGH during a deactivation period.

The first odd driving stage GCD11 includes a control circuit CC and an output circuit OC. The control circuit CC may include first to fifth driving transistors DT1 to DT5 and first and second driving capacitors C1 and C2. The output circuit OC may include first and second output transistors OT1 and OT2. In response to the first and second clock signals CLK1 and CLK2 and the first start signal FLM_O, the control circuit CC may control the potential of first and second nodes NQ and NQB. Here, the potential of the first node NQ may be referred to as a "first control signal". The potential of the second node NQB may be referred to as a "second control signal". The first and second output transistors OT1 and OT2 may output the first write scan signal GW1 in response to the first and second control signals, respectively.

The first driving transistor DT1 is connected between the third input terminal IN3 and the first node NQ, and includes a gate electrode connected to the first input terminal IN1. The second and third driving transistors DT2 and DT3 are connected in series between the first voltage terminal V1 and the first node NQ. In particular, the gate electrode of the second driving transistor DT2 is connected to the second node NQB, and the gate electrode of the third driving transistor DT3 is connected to the second input terminal IN2.

The fourth driving transistor DT4 is connected between the second node NQB and the first input terminal IN1, and includes a gate electrode connected to the third input terminal IN3. The fifth driving transistor DT5 is connected between the second node NQB and the second voltage terminal V2, and includes a gate electrode connected to the first input terminal IN1.

The first driving capacitor C1 is connected between the first node NQ and the first output terminal OUT1. The second driving capacitor C2 is connected between the second node NQB and the first voltage terminal V1.

In response to the first start signal FLM_O (or a previous carry signal CRk−1) and the first and second clock signals CLK1 and CLK2, the control circuit CC outputs the first control signal for controlling the first output transistor OT1 through the first node NQ and outputs the second control signal for controlling the second output transistor OT2 through the second node NQB. FIG. 6 shows a structure in which the control circuit CC includes the five driving transistors DT1 to DT5 and the two driving capacitors C1 and C2. However, the configuration of the control circuit CC is not limited thereto. That is, the number and connection relationship of driving transistors and driving capacitors included in the control circuit CC may be variously modified.

The output circuit OC includes the first and second output transistors OT1 and OT2. The first output transistor OT1 is connected between the second input terminal IN2 and the first output terminal OUT1, and includes a gate electrode connected to the first node NQ. The second output transistor OT2 is connected between the first voltage terminal V1 and the first output terminal OUT1, and includes a gate electrode connected to the second node NQB.

The first output transistor OT1 is turned on in response to the first control signal, and the second clock signal CLK2 is provided to the first output terminal OUT1 through the turned-on first output transistor OT1 such that the first write scan signal GW1 is activated. The second output transistor OT2 is turned on in response to the second control signal, and the first voltage VGH is provided to the first output terminal OUT1 through the turned-on second output transistor OT2 such that the first write scan signal GW1 is deactivated.

Figure 7A:
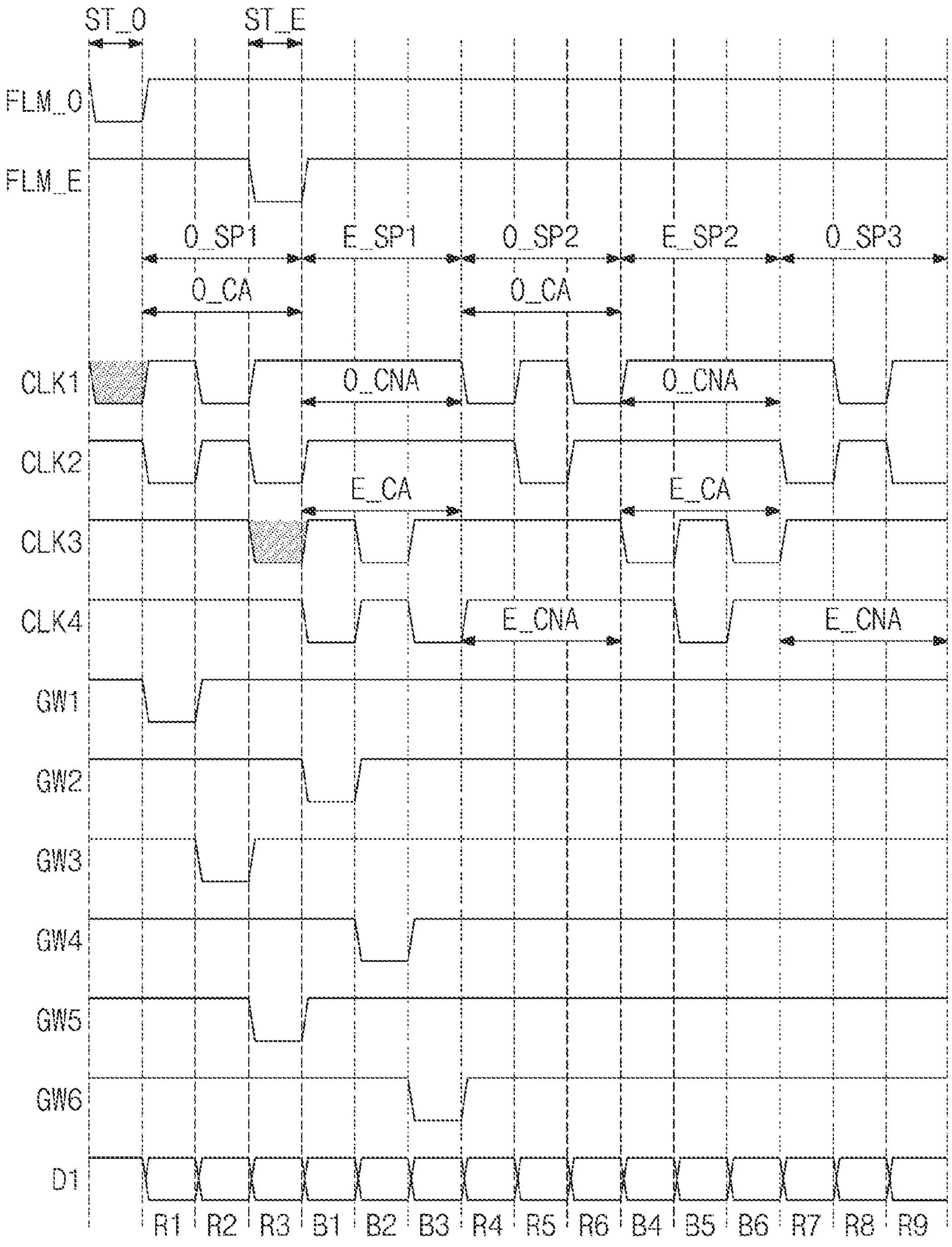
FIGS. 7A to 7C are timing diagrams for describing an operation of a scan driver, according to embodiments of the present disclosure.
Figure 7B:
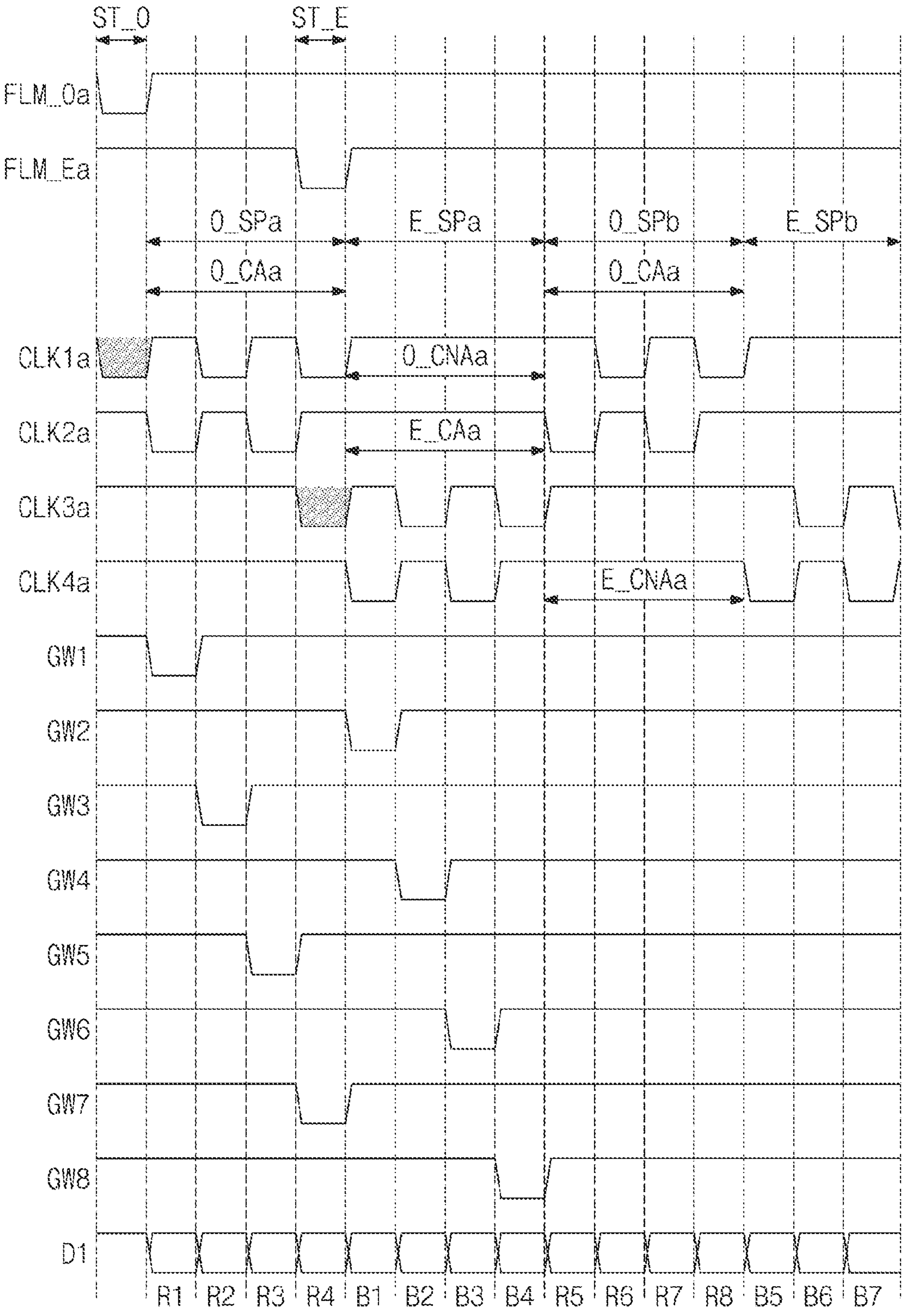
Figure 7C:
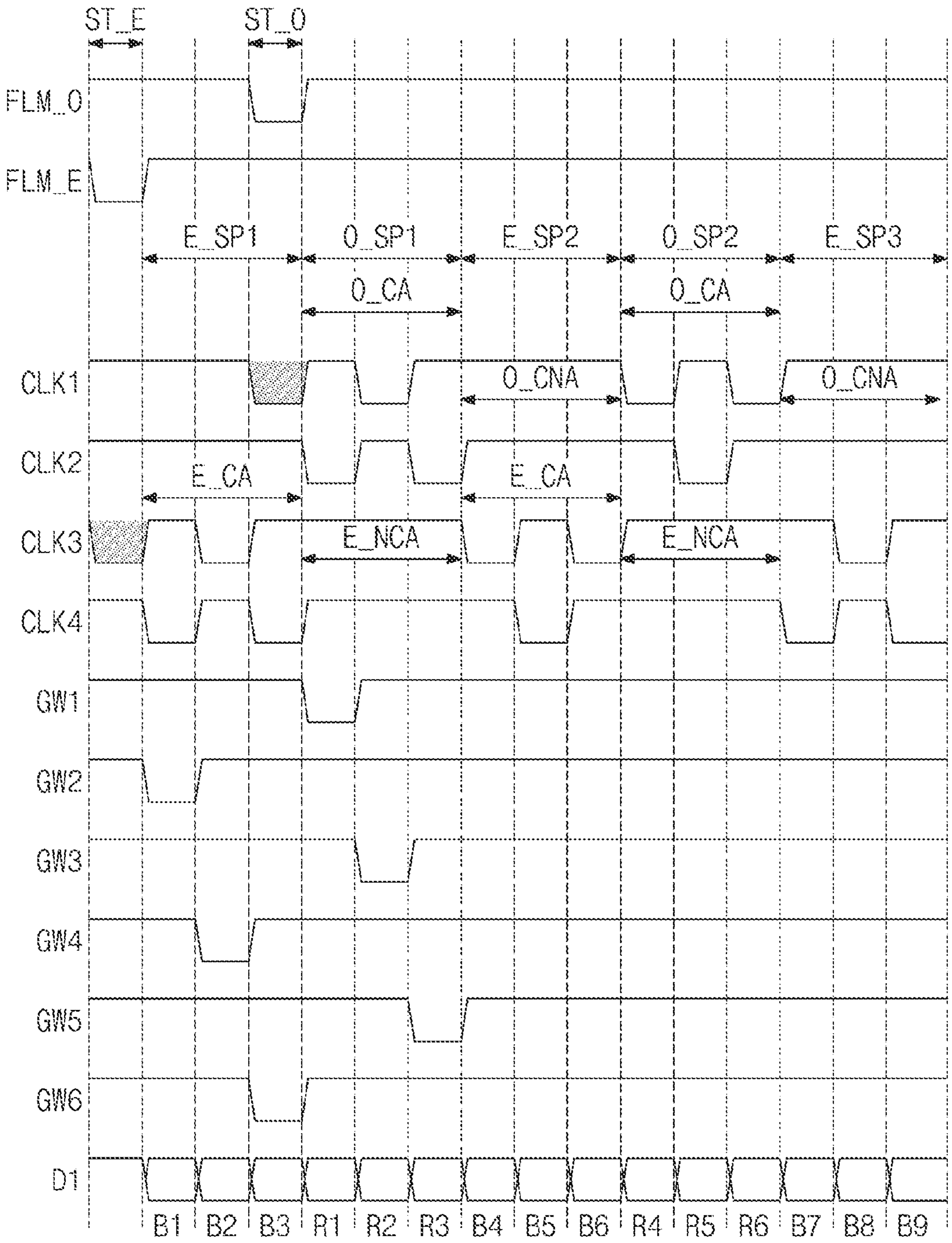

FIGS. 7A to 7C are timing diagrams for describing an operation of a first scan driver, according to embodiments of the present disclosure.

Referring to FIGS. 5, 6, and 7A, when the first start signal FLM_O transitions from a deactivation level (e.g., a high level) to an activation level ST_O (e.g., a low level), the operation of the first scan driver 310 may be started. The first odd driving stage GCD11 may start an operation in response to the activation period ST_O of the first start signal FLM_O. During the activation period ST_O of the first start signal FLM_O, the first clock signal CLK1 may have an activation level. The first odd driving stage GCD11 may receive the first and second clock signals CLK1 and CLK2 and may output the first write scan signal GW1 (or the first carry signal CR1) in response to an activation period of the second clock signal CLK2. Afterwards, the second odd driving stage GCD13 may receive the first carry signal CR1 to start an operation and may output the third write scan signal GW3 (or a third carry signal) in response to the activation period of the first clock signal CLK1. Next, the third odd driving stage GCD15 may receive the third carry signal to start an operation and may output the fifth write scan signal GW5 (or a fifth carry signal) in response to the activation period of the second clock signal CLK2.

In an example embodiment of the present disclosure, each of the first and second clock signals CLK1 and CLK2 include the first clock enable period O_CA and the first clock disable period O_CNA. In an embodiment, the first clock enable period O_CA does not overlap the activation period ST_O of the first start signal FLM_O. During the first clock enable period O_CA, the first and second clock signals CLK1 and CLK2 may be activated in units of one horizontal period (i.e., 1H). For example, the first clock signal CLK1 may transition to a first logic state (i.e., an activation state) at a first time, maintain the first logic state for the horizontal period after the first time, transition to a second logic state (i.e., an inactivation state) at the end of the horizontal period, and maintain the second logic state for the horizontal period. For example, the second clock signal CLK2 may transition to the second logic state at the first time, maintain the second logic state for a horizontal period after the first time, transition to the first logic state at the end of the horizontal period, and maintain the first logic state for the horizontal period. During the first clock disable period O_CNA, the first and second clock signals CLK1 and CLK2 may be maintained in an inactive state. In an example embodiment of the present disclosure, the duration of the first clock enable period O_CA corresponds to "k×1H", which is 'k' times greater than 1 horizontal period. The duration of the first clock disable period O_CNA may correspond to "k×1H" which is 'k' times greater than 1 horizontal period. Here, 'k' may be an integer of 2 or more. For example, when 'k' is 3, the duration of each of the first clock enable period O_CA and the first clock disable period O_CNA may correspond to 3H. In this case, three odd write scan signals (e.g., the first, third, and fifth write scan signals GW1, GW3, and GW5) may be sequentially activated (or output) during a period of 3H.

Afterwards, when the second start signal FLM_E transitions from a deactivation level (e.g., a high level) to an activation level ST_E (e.g., a low level), the first even driving stage GCD12 may start an operation in response to the activation period ST_E of the second start signal FLM_E. In an example embodiment of the present disclosure, the start time of the activation period ST_E of the second start signal FLM_E and the start time of the activation period ST_O of the first start signal FLM_O have a time difference (e.g., 3H) corresponding to 'k' times (i.e., k×1H) 1 horizontal period.

During the activation period ST_E of the second start signal FLM_E, the third clock signal CLK3 may have an activation level. The first even driving stage GCD12 may receive the third and fourth clock signals CLK3 and CLK4 and may output the second write scan signal GW2 (or a second carry signal) in response to the activation period of the fourth clock signal CLK4. Afterward, the second even driving stage GCD14 may receive the second carry signal to start an operation and may output the fourth write scan signal GW4 (or a fourth carry signal) in response to the activation period of the third clock signal CLK3. Next, the third even driving stage GCD16 may receive the fourth carry signal to start an operation and may output a sixth write scan signal GW6 (or a sixth carry signal) in response to the activation period of the fourth clock signal CLK4. In an example embodiment of the present disclosure, the activation period of the third clock signal CLK3 does not overlap the activation period of the first clock signal CLK1. In an embodiment, the activation period of the fourth clock signal CLK4 does not overlap the activation period of the second clock signal CLK2.

Each of the third and fourth clock signals CLK3 and CLK4 may include the second clock enable period E_CA and the second clock disable period E_CNA. In an embodiment, the second clock enable period E_CA does not overlap the activation period ST_E of the second start signal FLM_E. During the second clock enable period E_CA, the third and fourth clock signals CLK3 and CLK4 may be activated in units of 1 horizontal period (i.e., 1H). During the second clock disable period E_CNA, the third and fourth clock signals CLK3 and CLK4 may be maintained in an inactive state. In an example embodiment of the present disclosure, the duration of the second clock enable period E_CA corresponds to "k×1H", which is 'k' times greater than 1 horizontal period. The duration of the second clock disable period E_CNA may correspond to "k×1H" which is 'k' times greater than 1 horizontal period. Here, 'k' may be an integer of 2 or more. For example, when 'k' is 3, the duration of each of the second clock enable period E_CA and the second clock disable period E_CNA may correspond to 3H. In this case, during a period of 3H, three even write scan signals (e.g., the second, fourth, and sixth write scan signals GW2, GW4, and GW6) may be sequentially activated (or output). The first clock enable period O_CA and the second clock enable period E_CA may be alternately arranged. For example, the first clock enable period O_CA may alternate with the second clock enable period E_CA.

Here, periods in which the odd write scan signals GW1, GW3, and GW5 are sequentially output may be defined as odd scan periods O_SP1, O_SP2, and O_SP3. Periods in which the even write scan signals GW2, GW4, and GW6 are sequentially output may be defined as even scan periods E_SP1, E_SP2, and E_SP3. The duration of each of the odd scan periods O_SP1, O_SP2, and O_SP3 and the duration of each of the even scan periods E_SP1, E_SP2, and E_SP3 may correspond to "k×1H". For example, when 'k' is 3, the duration of each of the odd scan periods O_SP1, O_SP2, and O_SP3 may be 3H, and the duration of each of the even scan periods E_SP1, E_SP2, and E_SP3 may be 3H. The odd scan periods O_SP1, O_SP2, and O_SP3 and the even scan periods E_SP1, E_SP2, and E_SP3 may be alternately generated in units of 3H. For example, a first odd scan period O_SP1 among the odd scan periods O_SP1, O_SP2, and O_SP3 may occur during a first period, a first even scan period E_SP1 among the even scan periods E_SP1, E_SP2, and E_SP3 may occur during a second period sequentially after the first period, a second odd scan period O_SP2 among the odd scan periods O_SP1, O_SP2, and O_SP3 may occur again during a third period sequentially after the second period, a second even scan period E_SP2 among the even scan periods E_SP1, E_SP2, and E_SP3 may occur during a fourth period sequentially after the third period, etc.

During the first odd scan period O_SP1, first, second, and third red data signals R1, R2, and R3 to be applied to the red pixel circuit PXC_R connected to the first, third and fifth write scan lines GWL1, GWL3, and GWL5 may be applied to the first data line DL1. During the first even scan period E_SP1, first, second, and third blue data signals B1, B2, and B3 to be applied to the blue pixel circuit PXC_B connected to the second, fourth, and sixth write scan lines GWL2, GWL4, and GWL6 may be applied to the first data line DL1.

During the second odd scan period O_SP2, fourth, fifth, and sixth red data signals R4, R5, and R6 to be applied to the red pixel circuit PXC_R connected to the seventh, ninth, and eleventh write scan lines may be applied to the first data line DL1. During the second even scan period E_SP2, fourth, fifth, and sixth blue data signals B4, B5, and B6 to be applied to the blue pixel circuit PXC_B connected to the eighth, tenth, and twelfth write scan lines may be applied to the first data line DL1. During a third odd scan period O_SP3 among the odd scan periods O_SP1, O_SP2, and O_SP3, seventh, eighth, and ninth red data signals R7, R8, and R9 to be applied to the red pixel circuit PXC_R connected to the thirteenth, fifteenth, and seventeenth write scan lines may be applied to the first data line DL1.

As such, pieces of color information of the data signals D1 to D8 respectively applied to the data lines DL1 to DL8 are changed in units of time corresponding to "k×1H" without being changed in units of 1 horizontal period (1H), thereby preventing an increase in power consumed by the data driver 200 (see FIG. 1) without changing the pixel arrangement and the circuit configuration of a scan driver.

Referring to FIGS. 5, 6, and 7B, the first odd driving stage GCD11 may start an operation in response to the activation period ST_O of a first start signal FLM_Oa. During the activation period ST_O of the first start signal FLM_Oa, a first clock signal CLK1*a* may have an activation level. The first odd driving stage GCD11 may receive first and second clock signals CLK1*a* and CLK2*a* and may output the first write scan signal GW1 (or the first carry signal CR1) in response to an activation period of the second clock signal CLK2*a*. Afterwards, the second odd driving stage GCD13 may receive the first carry signal CR1 to start an operation and may output the third write scan signal GW3 (or a third carry signal) in response to the activation period of the first clock signal CLK1*a*. Next, the third odd driving stage GCD15 may receive the third carry signal to start an operation and may output the fifth write scan signal GW5 (or a fifth carry signal) in response to the activation period of the second clock signal CLK2*a*. The fourth odd driving stage GCD17 may receive the fifth carry signal to start an operation and may output the seventh write scan signal GW7 (or a seventh carry signal) in response to the activation period of the first clock signal CLK1*a*.

In an example embodiment of the present disclosure, the first and second clock signals CLK1*a* and CLK2*a* include a first clock enable period O_CAa and a first clock disable period O_CNAa, respectively. During the first clock enable period O_CAa, the first and second clock signals CLK1*a* and CLK2*a* may be activated in units of 1 horizontal period (i.e., 1H). During the first clock disable period O_CNAa, the first and second clock signals CLK1*a* and CLK2*a* may be maintained in an inactive state. In an example embodiment of the present disclosure, the duration of the first clock enable period O_CAa corresponds to "k×1H". The duration of the first clock disable period O_CNAa may correspond to "k×1H". Here, 'k' may be an integer of 2 or more. For example, when 'k' is 4, the duration of each of the first clock enable period O_CAa and the first clock disable period O_CNAa may correspond to 4H. In this case, during a period of 4H, four odd write scan signals (e.g., the first, third, fifth, and seventh write scan signals GW1, GW3, GW5, and GW7) may be sequentially activated (or output).

Afterwards, the first even driving stage GCD12 may start an operation in response to the activation period ST_E of a second start signal FLM_Ea. As an example of the present disclosure, the activation period ST_E of the second start signal FLM_Ea and the activation period ST_O of the first start signal FLM_Oa may have a time difference (e.g., 4H) corresponding to "k×1H". During the activation period ST_E of the second start signal FLM_Ea, a third clock signal CLK3*a* may have an activation level. The first even driving stage GCD12 may receive third and fourth clock signals CLK3*a* and CLK4*a* and may output the second write scan signal GW2 (or a second carry signal) in response to the activation period of the fourth clock signal CLK4*a*. Afterwards, the second even driving stage GCD14 may receive the second carry signal to start an operation and may output the fourth write scan signal GW4 (or a fourth carry signal) in response to the activation period of the third clock signal CLK3*a*. Next, the third even driving stage GCD16 may receive the fourth carry signal to start an operation and may output a sixth write scan signal GW6 (or a sixth carry signal) in response to the activation period of the fourth clock signal CLK4*a*. Afterwards, the fourth even driving stage GCD18 may receive the sixth carry signal to start an operation and may output the eighth write scan signal GW8 (or an eighth carry signal) in response to the activation period of the third clock signal CLK3*a*.

In an example embodiment of the present disclosure, each of the third and fourth clock signals CLK3*a* and CLK4*a* includes a second clock enable period E_CAa and a second clock disable period E_CNAa, respectively. During the second clock enable period E_CAa, the third and fourth clock signals CLK3*a* and CLK4*a* may be activated in units of 1 horizontal period (i.e., 1H). During the second clock disable period E_CNAa, the third and fourth clock signals CLK3*a* and CLK4*a* may be maintained in an inactive state. As an example of the present disclosure, the duration of the second clock enable period E_CAa may correspond to "k×1H". The duration of the second clock disable period E_CNAa may correspond to "k×1H". For example, when 'k' is 4, the duration of each of the second clock enable period E_CAa and the second clock disable period E_CNAa may correspond to 4H. In this case, during a period of 4H, four even write scan signals (e.g., the second, fourth, sixth, and eighth write scan signals GW2, GW4, GW6, and GW8) may be sequentially activated (or output).

Here, periods in which the odd write scan signals GW1, GW3, GW5, and GW7 are sequentially output may be defined as odd scan periods O_SPa and O_SPb. Periods in which the even write scan signals GW2, GW4, GW6, and GW8 are sequentially output may be defined as even scan periods E_SPa and E_SPb. The duration of each of the odd scan periods O_SPa and O_SPb and the duration of each of the even scan periods E_SPa and E_SPb may correspond to "k×1H". For example, when 'k' is 4, the duration of each of the odd scan periods O_SPa and O_SPb may be 4H, and the duration of each of the even scan periods E_SPa and E_SPb may be 4H. The odd scan periods O_SPa and O_SPb and the even scan periods E_SPa and E_SPb may be alternately generated in units of 4H. For example, the odd scan periods O_SPa and O_SPb may alternate with the even scan periods E_SPa and E_SPb.

During a first odd scan period O_SPa among the odd scan periods O_SPa and O_SPb, first, second, third, and fourth red data signals R1, R2, R3, and R4 to be applied to the red pixel circuit PXC_R connected to the first, third, fifth, and seventh write scan lines GWL1, GWL3, GWL5, and GWL7 may be applied to the first data line DL1. During a first even scan period E_SPa among the even scan periods E_SPa and E_SPb, first, second, third, and fourth blue data signals B1, B2, B3, and B4 to be applied to the blue pixel circuit PXC_B connected to the second, fourth, sixth, and eighth write scan lines GWL2, GWL4, GWL6, and GWL8 may be applied to the first data line DL1.

During a second odd scan period O_SPb among the odd scan periods O_SPa and O_SPb, fifth, sixth, seventh, and eighth red data signals R5, R6, R7, and R8 to be applied to the red pixel circuit PXC_R connected to the ninth, eleventh, thirteenth, and fifteenth write scan lines may be applied to the first data line DL1. During a second even scan period E_SPb of the even scan periods E_SPa and E_SPb, the fifth, sixth, and seventh blue data signals B5, B6, and B7 to be applied to the blue pixel circuit PXC_B connected to the tenth, twelfth, and fourteenth write scan lines may be applied to the first data line DL1.

As such, as pieces of color information of the data signals D1 to D8 respectively applied to the data line DL1 to DL8 are changed in units of 4H longer than the embodiment of FIG. 7A, power consumed by the data driver 200 (see FIG. 1) may be further reduced. That is, as a period during which the pieces of color information of the data signals D1 to D8 are changed becomes longer, the power consumption of the data driver 200 may be further reduced.

Referring to FIGS. 5, 6, and 7C, the second start signal FLM_E may transition from a deactivation level (e.g., a high level) to an activation level ST_E (e.g., a low level) before the first start signal. Accordingly, in an embodiment, in response to the activation period ST_E of the second start signal FLM_E, the first even driving stage GCD12 may start an operation before the first odd driving stage GCD11.

Periods in which the odd write scan signals GW1, GW3, and GW5 are sequentially output may be defined as the odd scan periods O_SP1, O_SP2, and O_SP3. Periods in which the even write scan signals GW2, GW4, and GW6 are sequentially output may be defined as the even scan periods E_SP1, E_SP2, and E_SP3. The duration of each of the odd scan periods O_SP1, O_SP2, and O_SP3 and the duration of each of the even scan periods E_SP1, E_SP2, and E_SP3 may correspond to "k×1H". For example, when 'k' is 3, the duration of each of the odd scan periods O_SP1, O_SP2, and O_SP3 may be 3H, and the duration of each of the even scan periods E_SP1, E_SP2, and E_SP3 may be 3H. The odd scan periods O_SP1, O_SP2, and O_SP3 and the even scan periods E_SP1, E_SP2, and E_SP3 may be alternately generated in units of 3H.

During the first even scan period E_SP1 among the even scan periods E_SP1, E_SP2, and E_SP3, first, second, and third blue data signals B1, B2, and B3 to be applied to the blue pixel circuit PXC_B connected to the second, fourth, and sixth write scan lines GWL2, GWL4, and GWL6 may be applied to the first data line DL1. Afterwards, the first odd scan period O_SP1 among the odd scan periods O_SP1, O_SP2, and O_SP3 may occur. During the first odd scan period O_SP1, first, second, and third red data signals R1, R2, and R3 to be applied to the red pixel circuit PXC_R connected to the first, third, and fifth write scan lines GWL1, GWL3, and GWL5 may be applied to the first data line DL1.

Next, the second even scan period E_SP2 among the even scan periods E_SP1, E_SP2, and E_SP3 may occur. During the second even scan period E_SP2, fourth, fifth, and sixth blue data signals B4, B5, and B6 to be applied to the blue pixel circuit PXC_B connected to the eighth, tenth, and twelfth write scan lines may be applied to the first data line DL1. Afterwards, the second odd scan period O_SP2 among the odd scan periods O_SP1, O_SP2, and O_SP3 may occur. During the second odd scan period O_SP2, fourth, fifth, and sixth red data signals R4, R5, and R6 to be applied to the red pixel circuit PXC_R connected to the seventh, ninth, and eleventh write scan lines may be applied to the first data line DL1. Next, during the third even scan period E_SP3 among the even scan periods E_SP1, E_SP2, and E_SP3, seventh, eighth, and ninth blue data signals B7, B8, and B9 to be applied to the blue pixel circuit PXC_B connected to the fourteenth, sixteenth, and eighteenth write scan lines may be applied to the first data line DL1.

As such, pieces of color information of the data signals D1 to D8 respectively applied to the data lines DL1 to DL8 are changed in units of 3H without being changed in units of 1H, thereby preventing an increase in power consumed by the data driver 200 (see FIG. 1) without changing the pixel arrangement and the circuit configuration of a scan driver.

Although embodiments of the present disclosure have been described for illustrative purposes, those skilled in the art will appreciate that various modifications, and substitutions are possible, without departing from the scope and spirit of the present disclosure as disclosed in the accompanying claims. Accordingly, the technical scope of the present disclosure is not limited to the detailed description of this specification.

According to an embodiment of the present disclosure, in a structure in which a first color pixel and a second color pixel are alternately connected to each data line, color information of a data signal applied to each data line is not changed in units of one horizontal period (1H), but is changed in units of time corresponding to "k×1H", thereby preventing an increase in power consumed by a data driver without the pixel arrangement and circuit configuration of a scan driver being changed.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:

a display panel including a plurality of pixels, a plurality scan lines, and a plurality of data lines;

a scan driver configured to provide scan signals to the plurality of scan lines; and a data driver configured to provide data signals to the plurality of data lines, wherein the scan driver comprises:

a first sub-scan driver configured to receive a first start signal, a first odd clock signal and a second odd clock signal, where a phase difference between the first and second odd clock signals is a horizontal period; and a second sub-scan driver configured to receive a second start signal, a first even clock signal and a second even clock signal, where a phase difference between the first and second even clock signals is the horizontal period, wherein each of the scan signals has an activation period corresponding to a horizontal period, wherein each of the first and second odd clock signals includes a first clock enable period, which is 'k' times the horizontal period, and a first clock disable period, which is 'k' times the horizontal period, wherein each of the first and second odd clock signals toggles between a first logic state and a second other logic state each time the horizontal period elapses during the first clock enable period, and maintains the first logic state during the first clock disable period, wherein each of the first and second even clock signals includes a second clock enable period, which is 'k' times the horizontal period, and a second clock disable period, which is 'k' times the horizontal period, wherein each of the first and second even clock signals toggles between the first logic state and the second logic state each time the horizontal period elapses during the second clock enable period, and maintains the first logic state during the second clock disable period, wherein the first clock enable period alternates with the second clock enable period, and the 'k' is an integer greater than or equal to 2, wherein color information of the data signal provided to at least one data line among the data lines is changed in units of time corresponding to 'k' times the horizontal period, wherein the first start signal includes an activation period that does not overlap the first clock enable period, and wherein the second start signal includes an activation period that does not overlap the second clock enable period, wherein the first and second odd clock signals have different numbers of activation periods within the first clock enable period, and wherein the first and second even clock signal have different numbers of activation periods within the second clock enable period.

2. The display device of claim 1, wherein each of the activation periods of the first and second odd clock signals has an activation level during the horizontal period within the first clock enable period, and wherein each of the activation periods of the first and second even clock signals has an activation level during the horizontal period within the second clock enable period.

3. The display device of claim 2, wherein the activation period of each of the first and second odd clock signals does not overlap the activation period of each of the first and second even clock signals.

4. The display device of claim 1, wherein a start time point of the activation period of the first start signal and a start time point of the activation period of the second start signal have a time difference corresponding to 'k' times the horizontal period.

5. The display device of claim 4, wherein the start time point of the activation period of the first start signal precedes the start time point of the activation period of the second start signal.

6. The display device of claim 4, wherein the start time point of the activation period of the second start signal precedes the start time point of the activation period of the first start signal.

7. The display device of claim 1, wherein the first sub-scan driver includes a plurality of odd driving stages, wherein an odd scan signal output from each of the plurality of odd driving stages is provided to a next odd driving stage, wherein the second sub-scan driver includes a plurality of even driving stages, and wherein an even scan signal output from each of the plurality of even driving stages is provided to a next even driving stage.

8. The display device of claim 1, wherein the plurality of pixels are grouped into a plurality of reference pixel units, and wherein each of the reference pixel units includes four pixels.

9. The display device of claim 8, wherein the four pixels comprise:

a first green pixel;

a second green pixel;

a red pixel; and a blue pixel.

10. The display device of claim 9, wherein the red pixel and the blue pixel are alternately connected to the at least one data line among the plurality of data lines.

11. An electronic device comprising:

a display panel including a plurality of pixels, a plurality of write scan lines connected to the plurality of pixels;

a scan driver configured to provide write scan signals to the write scan lines; and a data driver configured to provide data signals to the data lines, wherein a first color pixel among the pixels and a second color pixel among the pixels are alternately connected to the corresponding data line among the plurality of data lines, wherein the each of the write scan signals has an activation period corresponding to a horizontal period, wherein color information of the data signal provided to the corresponding data line is changed in units of time corresponding to 'k' times the horizontal period, and the 'k' is an integer greater than or equal to 2, wherein a stage of the scan driver receives first and second start signals, first and second clock signals that toggle between a first logic state and a second other logic state each time the horizontal period elapses during a clock enable period that is 'k' times the horizontal period, and maintains the first logic state for 'k' horizontal periods during a clock disable period that is 'k' times the horizontal period, where a phase difference between the first and second clock signals is the horizontal period, wherein the first start signal includes an activation period that does not overlap the clock enable period, wherein the second start signal includes an activation period that does not overlap the clock enable period, and wherein the first and second clock signals have different numbers of activation periods within the clock enable period.

12. The electronic device of claim 11, wherein the plurality of pixels are grouped into a plurality of reference pixel units, and wherein each of the reference pixel units includes four pixels.

13. The electronic device of claim 12, wherein the four pixels include:

a first green pixel;

a second green pixel;

a red pixel; and a blue pixel, and wherein the first color pixel and the second color pixel respectively correspond to the red pixel and the blue pixel.

14. The electronic device of claim 11, wherein the scan driver comprises:

a first sub-scan driver configured to receive the first start signal and at least one odd clock signal and to output odd scan signals during an odd scan period; and a second sub-scan driver configured to receive the second start signal and at least one even clock signal and to output even scan signals during an even scan period.

15. The electronic device of claim 14, wherein each of the odd scan period and the even scan period has a duration that is 'k' times the horizontal period, and wherein the odd scan period and the even scan period alternate with one another.

16. The electronic device of claim 15, wherein the odd clock signal includes a first clock enable period and a first clock disable period that is 'k' times the horizontal period, wherein the even clock signal includes a second clock enable period, which is 'k' times the horizontal period, and a second clock disable period, which is 'k' times the horizontal period, and wherein the first clock enable period and the second clock enable period alternate with one another.

17. The electronic device of claim 16, wherein the odd scan period corresponds to the first clock enable period, and wherein the even scan period corresponds to the second clock enable period.

* * * * *